United States Patent
Neo et al.

(10) Patent No.: US 9,786,313 B2
(45) Date of Patent: Oct. 10, 2017

(54) OPTICAL-INFORMATION RECORDING/REPRODUCING APPARATUS AND OPTICAL-INFORMATION RECORDING/REPRODUCING METHOD

(71) Applicant: Hitachi-LG Data Storage, Inc., Tokyo (JP)

(72) Inventors: Atsushi Neo, Tokyo (JP); Nobutaka Amada, Tokyo (JP)

(73) Assignee: Hiatchi-LG Data Storage, Inc., Tokyo (JP)

( * ) Notice: Subject to any disclaimer, the term of this patent is extended or adjusted under 35 U.S.C. 154(b) by 0 days.

(21) Appl. No.: 15/263,786

(22) Filed: Sep. 13, 2016

(65) Prior Publication Data
US 2017/0098461 A1   Apr. 6, 2017

(30) Foreign Application Priority Data
Oct. 5, 2015   (JP) .................................. 2015-197295

(51) Int. Cl.
| | |
|---|---|
| *G11B 7/0065* | (2006.01) |
| *G11B 7/007* | (2006.01) |
| *G11B 7/005* | (2006.01) |
| G11B 7/24097 | (2013.01) |
| G11B 7/00 | (2006.01) |
| G11B 7/09 | (2006.01) |
| G11B 7/0037 | (2006.01) |

(52) U.S. Cl.
CPC ........ *G11B 7/00781* (2013.01); *G11B 7/0053* (2013.01); *G11B 7/0065* (2013.01); *G11B 7/0037* (2013.01); *G11B 7/09* (2013.01); *G11B 7/24097* (2013.01); *G11B 2007/0009* (2013.01)

(58) Field of Classification Search
None
See application file for complete search history.

(56) References Cited

FOREIGN PATENT DOCUMENTS

| | | |
|---|---|---|
| JP | 2002-023851 A | 1/2002 |
| JP | 2012-194831 A | 10/2012 |

*Primary Examiner* — Brian Butcher
(74) *Attorney, Agent, or Firm* — Mattingly & Malur, PC

(57) ABSTRACT

An optical-information recording/reproducing apparatus of the present invention is capable of carrying out position detection of a reproduction image even if reproduction image data with incomplete alignment marks (markers) is obtained. A relative correlation value is calculated from a first correlation value retained by a first correlation-value retaining unit and a second correlation value retained by a second correlation-value retaining unit, and pass/fail of a position detection result of the marker is judged according to the relative correlation value. The pass/fail of the position detection result is judged by mutually comparing the detection positions of the markers judged as passes by the relative correlation-value judgement, the positions of the markers judged as fail by the relative correlation-value judgement or the mutual position judgement is complemented, and the position of two-dimensional data is detected based on the pass-judged markers and the complemented markers.

18 Claims, 17 Drawing Sheets

FIG. 11
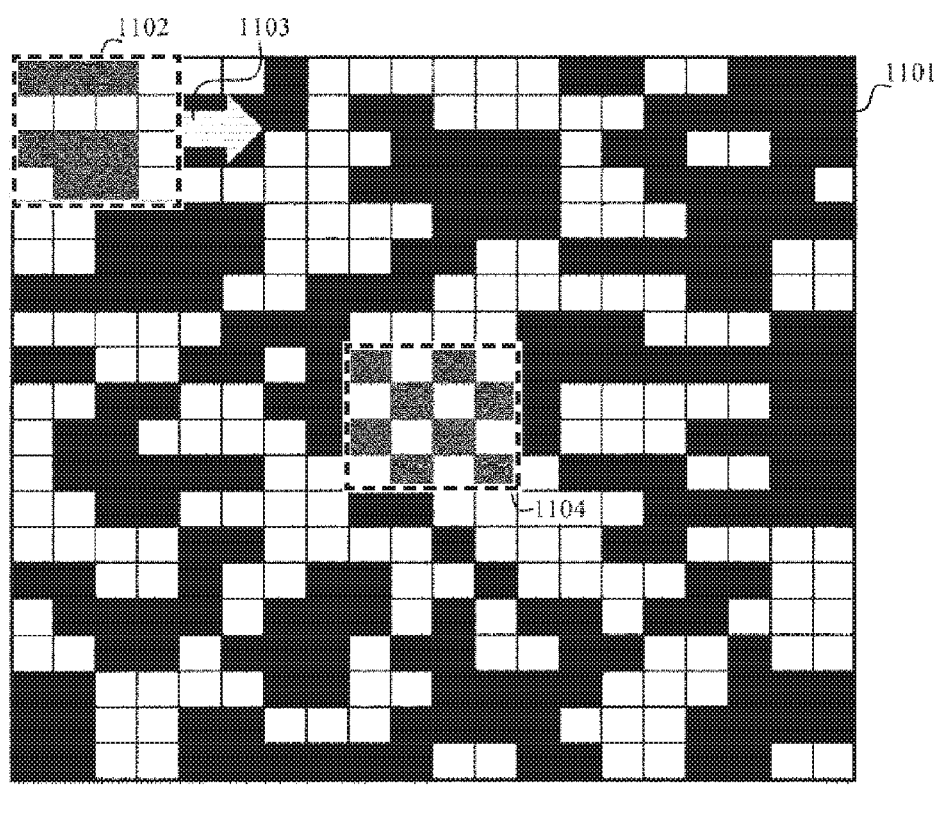
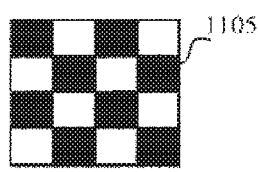

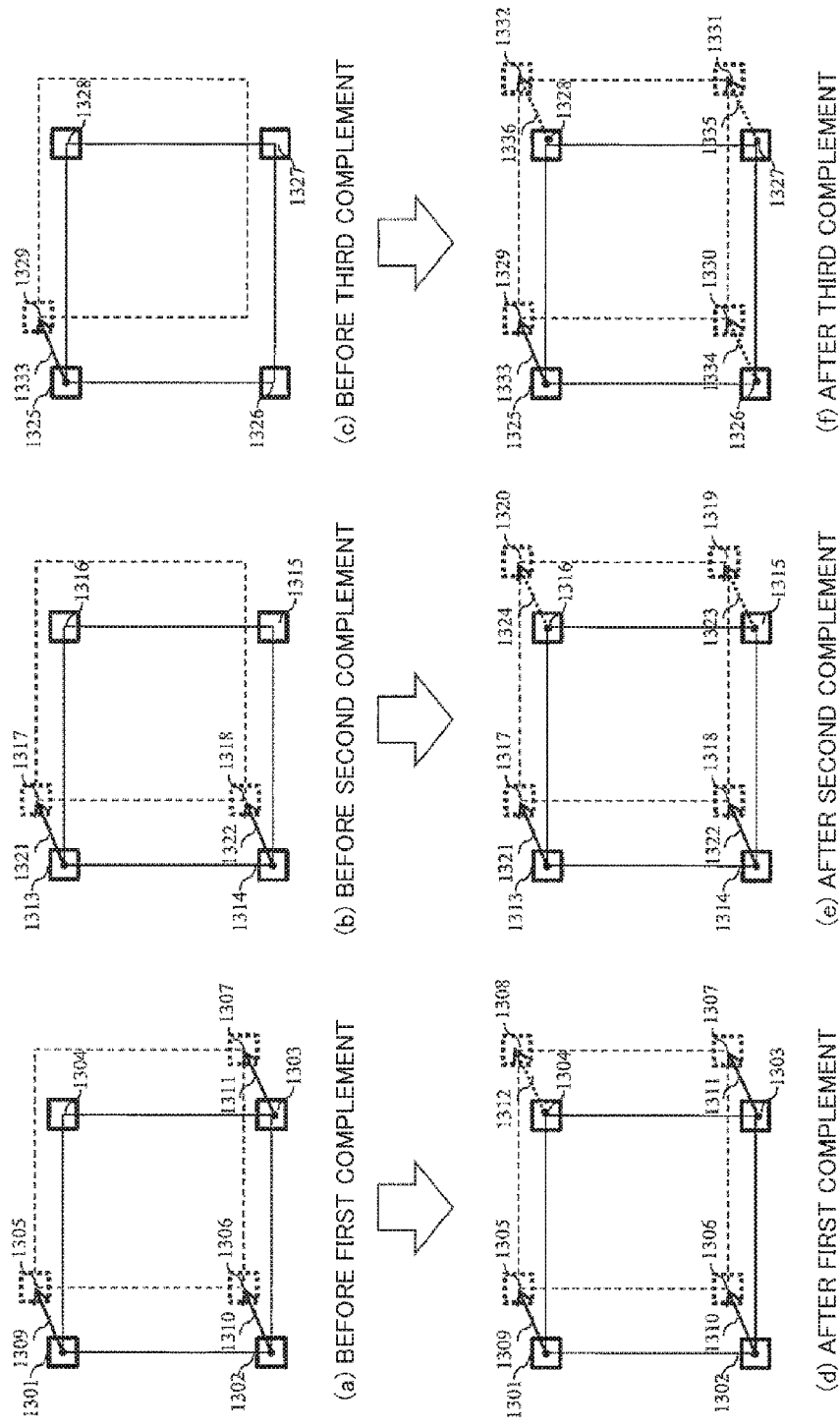

F I G. 1 4
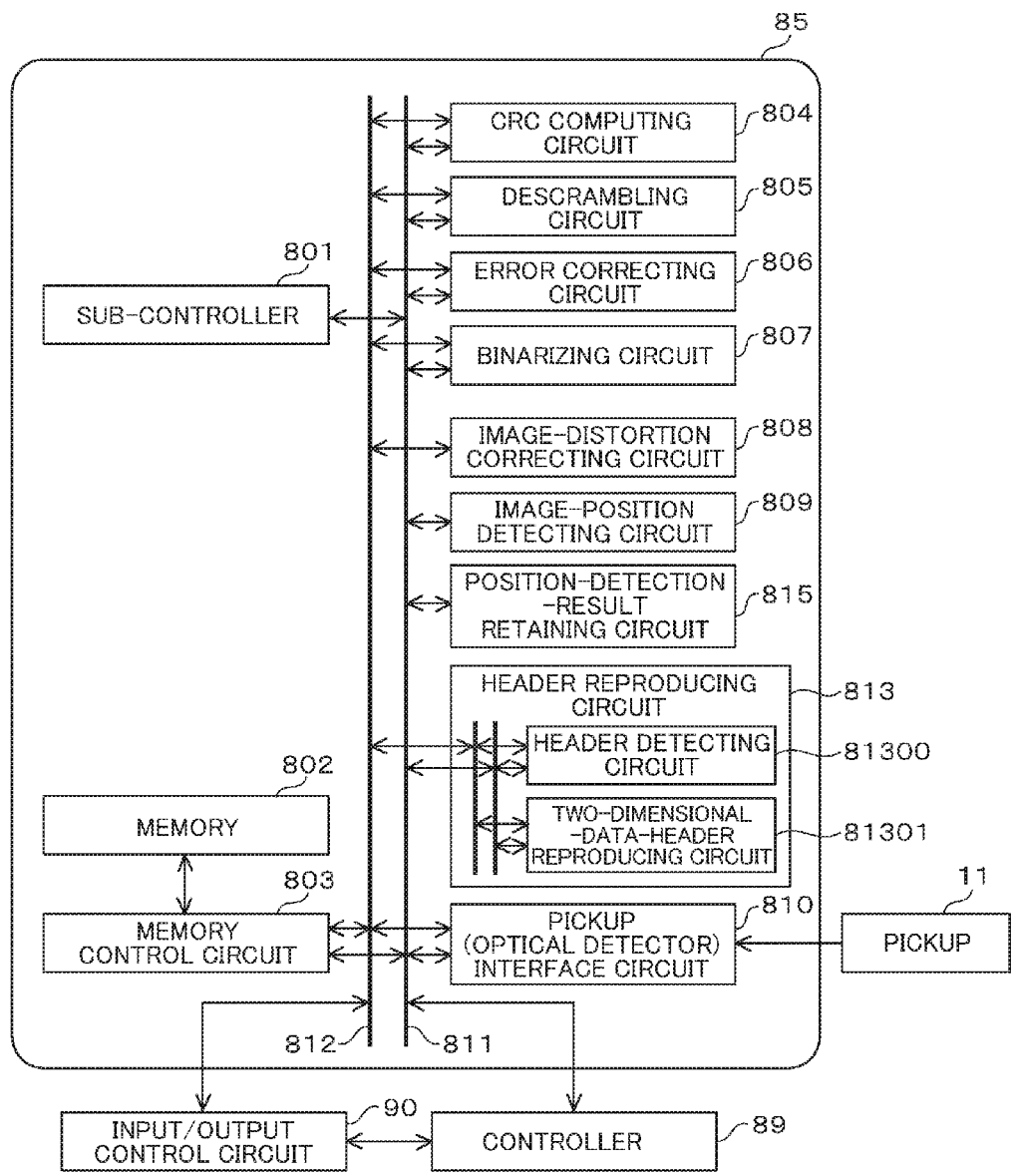

OPTICAL-INFORMATION RECORDING/REPRODUCING APPARATUS AND OPTICAL-INFORMATION RECORDING/REPRODUCING METHOD

CLAIM OF PRIORITY

The present application claims priority from Japanese patent application serial No. JP 2015-197295, filed on Oct. 5, 2015, the content of which is hereby incorporated by reference into this application.

BACKGROUND OF THE INVENTION (1) Field of the Invention

The present invention relates to an optical-information recording/reproducing apparatus and an optical-information recording/reproducing method.

(2) Description of the Related Art

Background techniques include Japanese Patent Application Laid-Open No. 2012-194831 and Japanese Patent Application Laid-Open No. 2002-023851. Japanese Patent Application Laid-Open No. 2002-023851 describes that "alignment marks at least at two or more locations formed on a member are acquired by visual sensors respectively corresponding to them, and the positions thereof are detected".

SUMMARY OF THE INVENTION

In a holographic recording/reproducing apparatus using holography, coherent light is reflected by or transmitted through a spatial light modulator, and a signal beam spatially modulated in accordance with the two-dimensional data and a reference beam of the coherent light are input to an optical information medium so that they are overlapped with each other, thereby forming an interference pattern. Information is recorded by writing this pattern to the optical information medium. Meanwhile, recording by angle multiplexing can be carried out by changing the incident angle of the reference beam input to the optical information medium. In the holograms recorded by changing the reference beam angle in the same region in this manner, the hologram corresponding to each one of the reference beam angles is referred to as a page, and a group of pages which have undergone angle multiplexing in the same region is referred to as a book. In a case of reproducing of the optical information medium of the holographic recording/reproducing apparatus, a reference beam is supplied to the optical information medium at an angle similar to that in the case of recording, and, as a result, the signal beam can be reproduced from a page corresponding to the reference beam. By observing this signal beam by a light detector and acquiring a reproduction image, the information recorded in the optical information medium is reproduced.

However, due to part attachment errors and/or positioning control errors, it is difficult in reproduction to reproduce the position and the reference beam angle of the optical information medium of the point of recording. Therefore, the reproduced signal beam cannot be supplied to predetermined pixels of the light detector without errors. Therefore, the reproduction image acquired by the light detector has to be subjected to position detection in order to reproduce the information recorded in the optical information medium.

However, when the position detection is carried out, if alignment marks (markers) are incomplete due to a signal beam having brightness unevenness and/or part defects, the position detection of the reproduction image cannot be carried out, and the information recorded in the optical information medium cannot be reproduced.

Japanese Patent Application Laid-Open No. 2012-194831 describes that "a position-detecting pattern replacing unit 30 replaces a position-detecting pattern 510 in image data vd by a reference pattern based on the position and size of the position-detecting pattern 510. Since the reference pattern is a position-detecting pattern having a certain contrast ratio or more, the brightness contrast between white modules and black modules becomes clear. In this manner, by using the reference pattern after replacement, a code reading apparatus 1000 can decode a barcode 500 while using the pattern having a certain contrast ratio or more as a reference."

However, in Japanese Patent Application Laid-Open No. 2012-194831, even when the marker is not incomplete and is correctly detected, the position-detecting pattern is replaced by the reference pattern, and, therefore, accuracy of position detection may be reduced.

If position detection is carried out by using the method of Japanese patent Application Laid-Open No. 2002-023851, if the alignment mark (marker) are incomplete due to a signal beam having brightness unevenness and/or apart defect, the position detection of the reproduction image cannot be carried out, and the information recorded in the optical information medium cannot be reproduced.

In order to solve the above described problems, the present invention uses the configurations described in claims.

According to the present invention, even if alignment marks (markers) are incomplete due to signal beams having brightness unevenness and/or part defects, the position detection of reproduction images can be accurately carried out, and the information recorded in the optical information medium can be reproduced.

BRIEF DESCRIPTION OF THE DRAWINGS

FIG. 11 is an explanatory drawing showing a method of calculating correlation values according to the present invention;

FIG. 13 is an explanatory drawing showing a method of processing complementing according to the present invention;

FIG. 14 is an outline drawing showing an embodiment of the signal processing circuit in the optical-information recording/reproducing apparatus.

DETAILED DESCRIPTION OF THE EMBODIMENT

Hereinafter, the present invention will be described by using drawings.

First Embodiment

Figure 2:
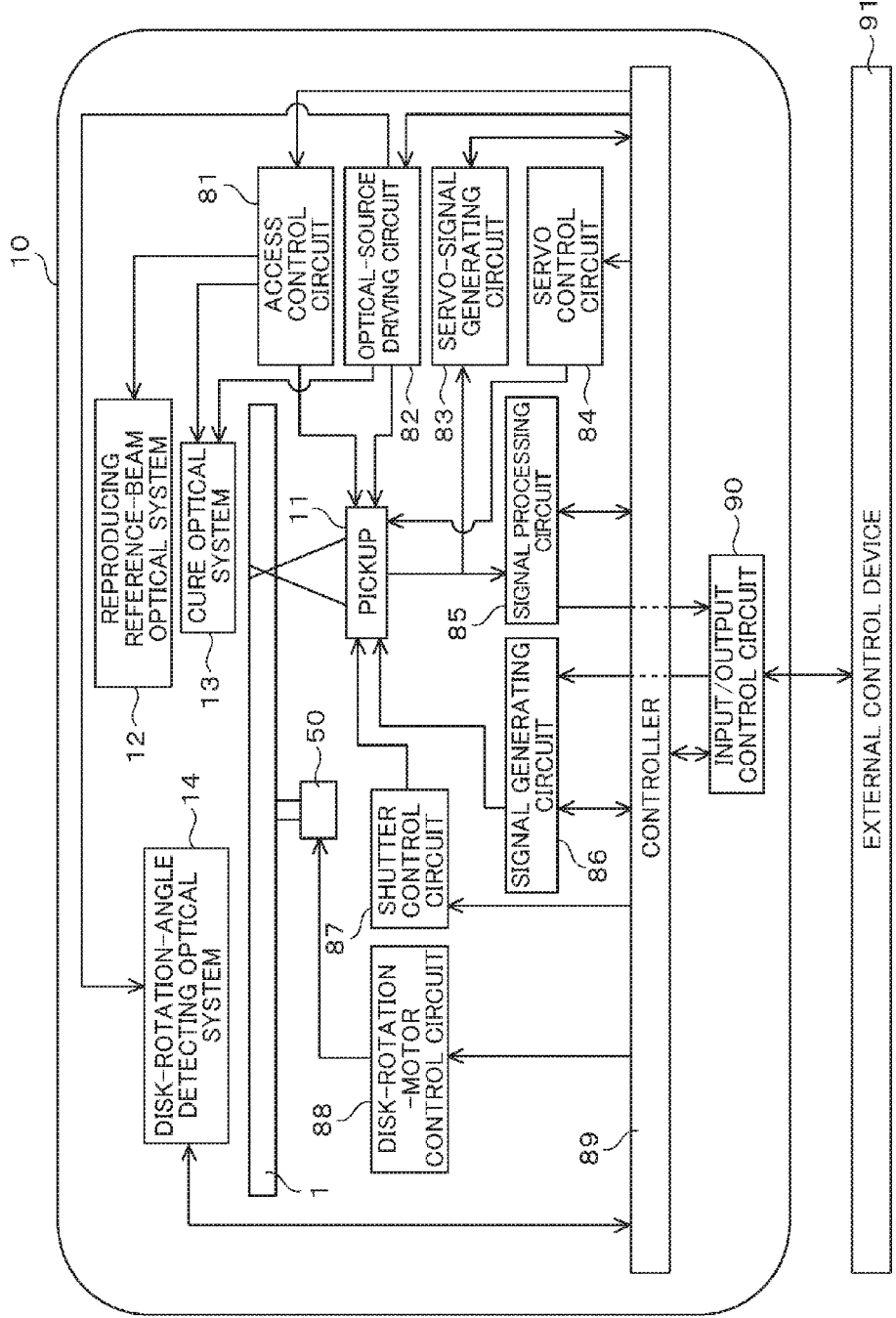
FIG. 2 is a block diagram of an optical-information recording/reproducing apparatus.

An embodiment of the present invention will be described by using accompanying drawings. FIG. 2 is a block diagram showing a recording/reproducing apparatus of an optical-information recording medium, which records and/or reproduces information by utilizing holography. An optical-information recording/reproducing apparatus 10 is connected to an external control device 91 via an input/output control circuit 90. In a case of recording, the optical-information recording/reproducing apparatus 10 receives information, which is to be recorded from the external control device 91, by the input/output control circuit 90. In a case of reproducing, the optical-information recording/reproducing apparatus 10 transmits reproduced information to the external control device 91 by the input/output control circuit 90.

The optical-information recording/reproducing apparatus 10 is provided with a pickup 11, a reproducing reference-beam optical system 12, a cure optical system 13, a disk-rotation-angle detecting optical system 14, and a rotary motor 50, and an optical-information recording medium 1 has a disk shape which can be rotated by the rotary motor 50. The pickup 11 functions to record two-dimensional data by utilizing holography by exposing the optical-information recording medium 1 to a reference beam and a signal beam. In this process, the two-dimensional data to be recorded is transmitted by a controller 89 to a spatial light modulator in the pickup 11 via a signal generating circuit 86, and the signal beam is modulated by the spatial light modulator.

When the information recorded in the optical-information recording medium 1 is to be reproduced, light waves which are to be input to the optical-information recording medium are generated by the reproducing reference-beam optical system 12 in the direction opposite to the direction in the case of recording of the reference beam output from the pickup 11. A signal beam reproduced by the reference beam is detected by a later-described light detector, which is in the pickup 11, and signals are reproduced by a signal processing circuit 85. The exposure time of the reference beam and the signal beam, which expose the optical-information recording medium 1, can be adjusted by controlling opening/closing of a shutter in the pickup 11 by the controller 89 via a shutter control circuit 87.

The cure optical system 13 functions to generate optical beams which are used in pre-cure and post-cure of the optical-information recording medium 1. The pre-cure is a pre-process in which, when information is to be recorded at a desired position in the optical-information recording medium 1, a predetermined optical beam is subjected to exposure in advance before the desired position is exposed to the reference beam and the signal beam. The post-cure is a post-process in which, after information is recorded at a desired position in the optical-information recording medium 1, a predetermined optical beam is subjected to exposure in order to disable additional recording at the desired position.

The disk-rotation-angle detecting optical system 14 is used for detecting the rotation angle of the optical-information recording medium 1. When the optical-information recording medium 1 is to be adjusted to a predetermined rotation angle, a signal corresponding to the rotation angle thereof is detected by the disk-rotation-angle detecting optical system 14, and the rotation angle of the optical-information recording medium 1 can be controlled by the controller 89 by using the detected signal via a disk-rotation-motor control circuit 88.

Predetermined optical-source drive currents are supplied from an optical-source driving circuit 82 to optical sources in the pickup 11, the cure optical system 13, and the disk-rotation-angle detecting optical system 14, and optical beams are emitted by predetermined light intensities from the respective optical sources. The pickup 11 and the disk-cure optical system 13 are provided with mechanisms capable of sliding positions thereof in a radial direction of the optical-information recording medium 1, and positional control is carried out via an access control circuit 81.

Incidentally, recording techniques utilizing the principles of angle multiplexing of holography have a tendency that acceptable errors with respect to mismatches of reference-beam angles are extremely small. Therefore, a mechanism which detects a mismatched amount of the reference-beam angle has to be provided in the pickup 11, a signal for servo control has to be generated in a servo-signal generating circuit 83, and a servo mechanism for correcting the mismatched amount via a servo control circuit 84 has to be provided in the optical-information recording/reproducing apparatus 10. Some optical-system configurations or all optical-system configurations of the pickup 11, the cure optical system 13, and the disk-rotating-angle detecting optical system 14 may be simplified by integration into one.

Figure 3:
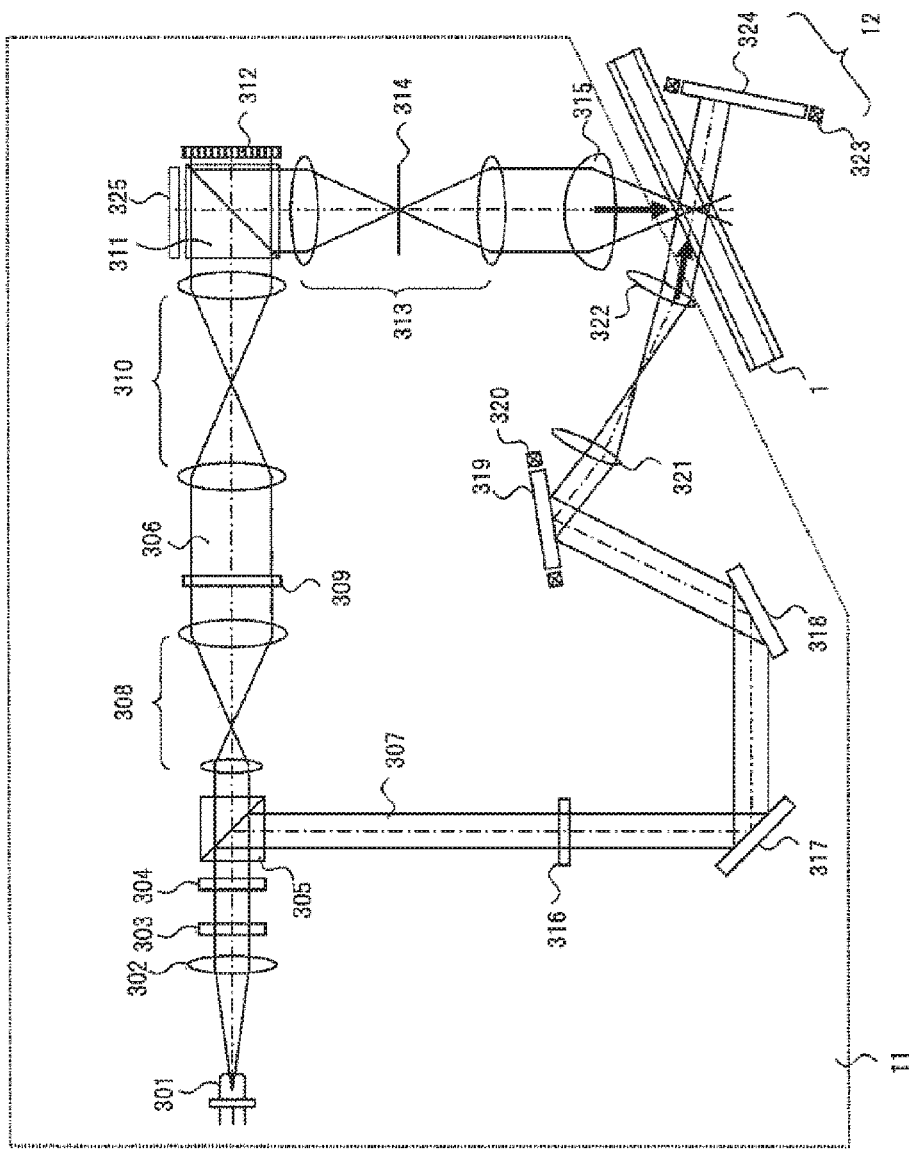
FIG. 3 is an outline drawing showing an embodiment of a pickup in the optical-information recording/reproducing apparatus.

FIG. 3 shows recording principles in an example of a basic optical-system configuration of the pickup 11 in the optical-information recording/reproducing apparatus 10. An optical beam output from an optical source 301 transmits through a collimator lens 302 and is input to a shutter 303. When the shutter 303 is open, the optical beam passes through the shutter 303 and is then subjected to control of a polarization direction, for example, so that a light intensity ratio of p-polarization and s-polarization is caused to be a desired ratio by an optical element 304 comprised of, for example, a half-wavelength plate or the like; and, then, the optical beam is input to a PBS (Polarization Beam Splitter) prism 305. The optical beam transmitted through the PBS prism 305 functions as a signal beam 306, is subjected to expansion of an optical-beam diameter thereof by a beam expander 308, then transmits through a phase mask 309, relay lenses 310, and a PBS prism 311, and is input to a spatial light modulator 312.

The signal beam to which two-dimensional data is added by the spatial light modulator 312 is reflected by a PBS prism 311 and propagates through relay lenses 313 and a spatial filter 314. Then, the signal beam is concentrated on the optical-information recording medium 1 by an objective lens 315.

On the other hand, the optical beam reflected by the PBS prism. 305 works as a reference beam. 307, is set to a predetermined polarization direction by a polarization-direction converting element 316 depending on a recording case or a reproducing case, and is then input to a galvano-mirror 319 through a mirror 317 and a mirror 318. Since the angle of the galvano-mirror 319 can be adjusted by an actuator 320, the incident angle of the reference beam which is input to the optical-information recording medium 1 after passing through a lens 321 and 322 can be set to a desired angle. Note that, in order to set the incident angle of the reference beam, an element which converts a wavefront of the reference beam may be used instead of the galvano-mirror.

When the signal beam and the reference beam are input in this manner so as to be overlapped with each other on the optical-information recording medium 1, an interference pattern is formed in the recording medium, and information is recorded by writing this pattern to the optical-information recording medium 1. Since the incident angle of the reference beam input to the optical-information recording medium 1 can be changed by the galvano-mirror 319, recording by angle multiplexing can be carried out.

Figure 4:
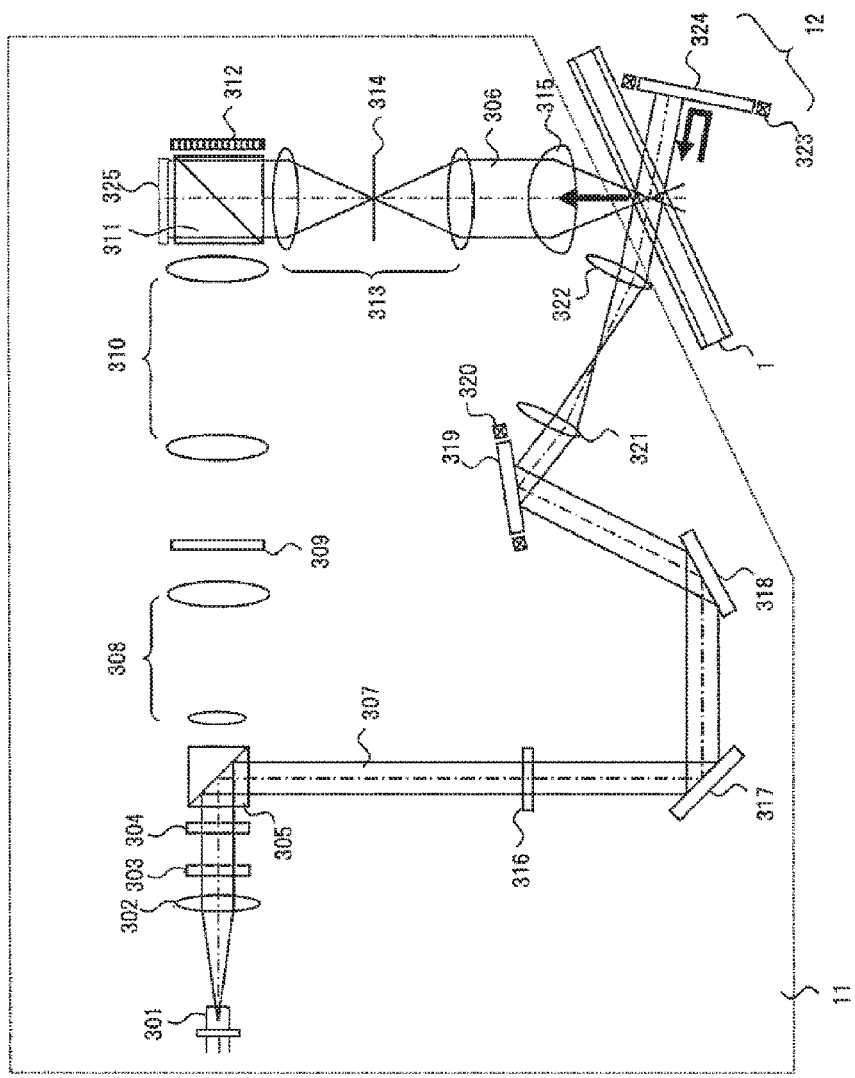
FIG. 4 is an outline drawing showing an embodiment of the pickup in the optical-information recording/reproducing apparatus.

FIG. 4 shows reproducing principles in an example of the basic optical-system configuration of the pickup 11 in the optical-information recording/reproducing apparatus 10. When recorded information is to be reproduced, a reference beam reproducing a desired page is generated by inputting a reference beam to the optical-information recording medium 1 in the above described manner and reflecting the reference beam, which has transmitted through the optical-information recording medium 1, to galvano-mirror 324, which can adjust the angle thereof by an actuator 323.

The signal beam reproduced by this reference beam propagates through the objective lens 315, the relay lenses 313, and the spatial filter 314. Then, the signal beam transmits through the PBS prism 311 and is input to a light detector 325, and reproduction of recorded signals can be carried out. As the light detector 325, for example, an image-pickup element such as a CMOS image sensor or a CCD image sensor can be used; however, as long as two-dimensional data can be picked up as a reproduction image, any element can be used.

Figure 7:
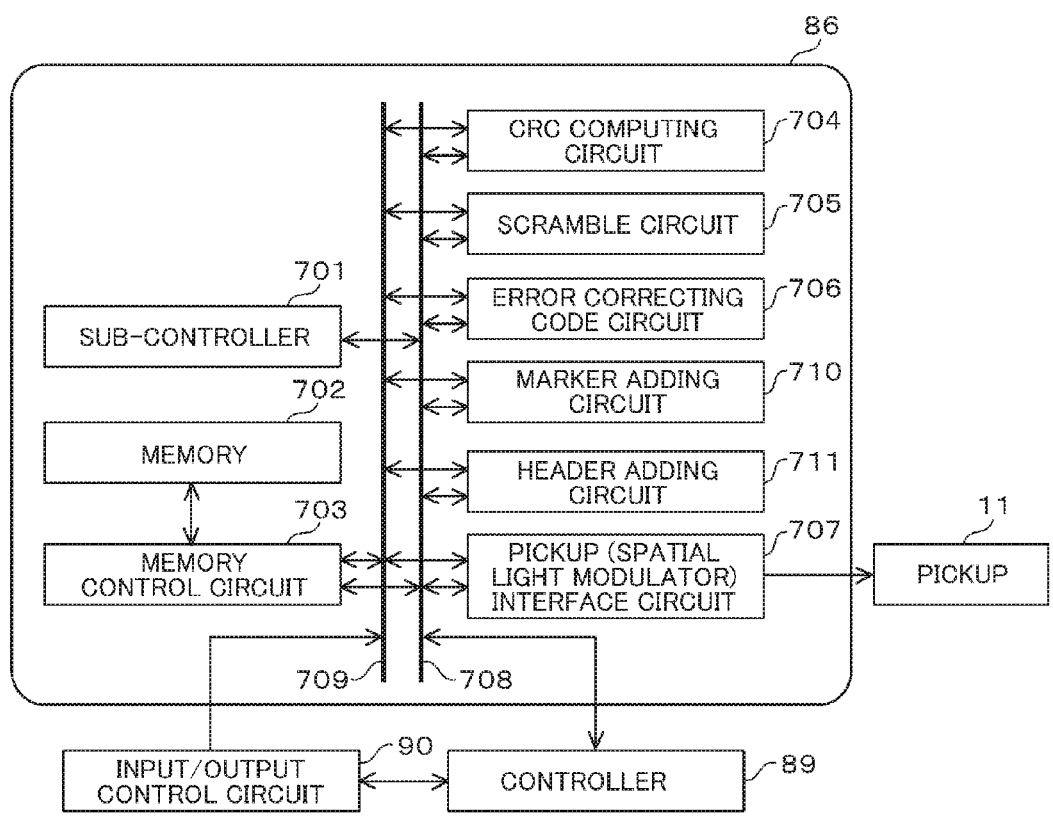
FIG. 7 is an outline drawing showing an embodiment of a signal generating circuit in the optical-information recording/reproducing apparatus.

FIG. 7 is a block diagram of the signal generating circuit 86 of the optical-information recording/reproducing apparatus 10.

When information is input from the input/output control circuit 90, the input/output control circuit 90 notifies the controller 89 that input of information has been started. The controller 89 receives this notification, orders the signal generating circuit 86 to subject the information corresponding to one sheet of the two-dimensional data input from the input/output control circuit 90 to record processing, and gives the information which is to be stored in a page header to a header adding circuit 711. The processing order from the controller 89 is notified to a sub-controller 701 in the signal generating circuit 86 through a control line 708. In response to this notification, the sub-controller 701 controls signal processing circuits via the control line 708 so that the signal processing circuits are operated in parallel. First, information input from the input/output control circuit 90 to a memory control circuit 703 via a data line 709 is controlled so as to be stored in a memory 702. When the information stored in the memory 702 reaches a certain volume, control of subjecting the information to CRC is carried out by a CRC computing circuit 704. Then, the information which has undergone CRC is subjected to scrambling in which a pseudorandom-number data string is added thereto by a scramble circuit 705, and control to carry out error correcting coding of adding a parity data string is carried out by an error correcting code circuit 706.

On the other hand, a marker adding circuit 710 generates a marker (s) which serves as a reference (s) in a case of reproducing and stores the marker(s) in the memory 702. The header-pattern adding circuit 711 generates information such as a type and/or a format of the information, which is to be recorded as two-dimensional data, and a book number based on the information stored in the two-dimensional data header supplied from the controller 89, generates a recording pattern of the two-dimensional data header based on the generated information, and stores that in the memory 702.

Note that, since the two-dimensional data header added by the header-pattern adding circuit 711 is used also in positional control by the access control circuit 81 before reproduction of information, the two-dimensional data header is generated in an easily reproducible format compared with information. The marker(s) which is generated by the marker adding circuit 710 and serves as a reference(s) in a case of reproducing is in a format determined in advance; wherein, the larger the number of the markers, the more accurate enabled positioning is. However, the number of the generated marker (s) is not limited and may be singular or plural.

In the end, a pickup interface circuit 707 reads the recording pattern of information, the recording pattern of the two-dimensional data header, and the marker(s), which serves as a reference(s) in a case of reproducing, from the memory 702 in the order of arrangement of the two-dimensional data and transmits them to the spatial light modulator 312.

Figure 8:
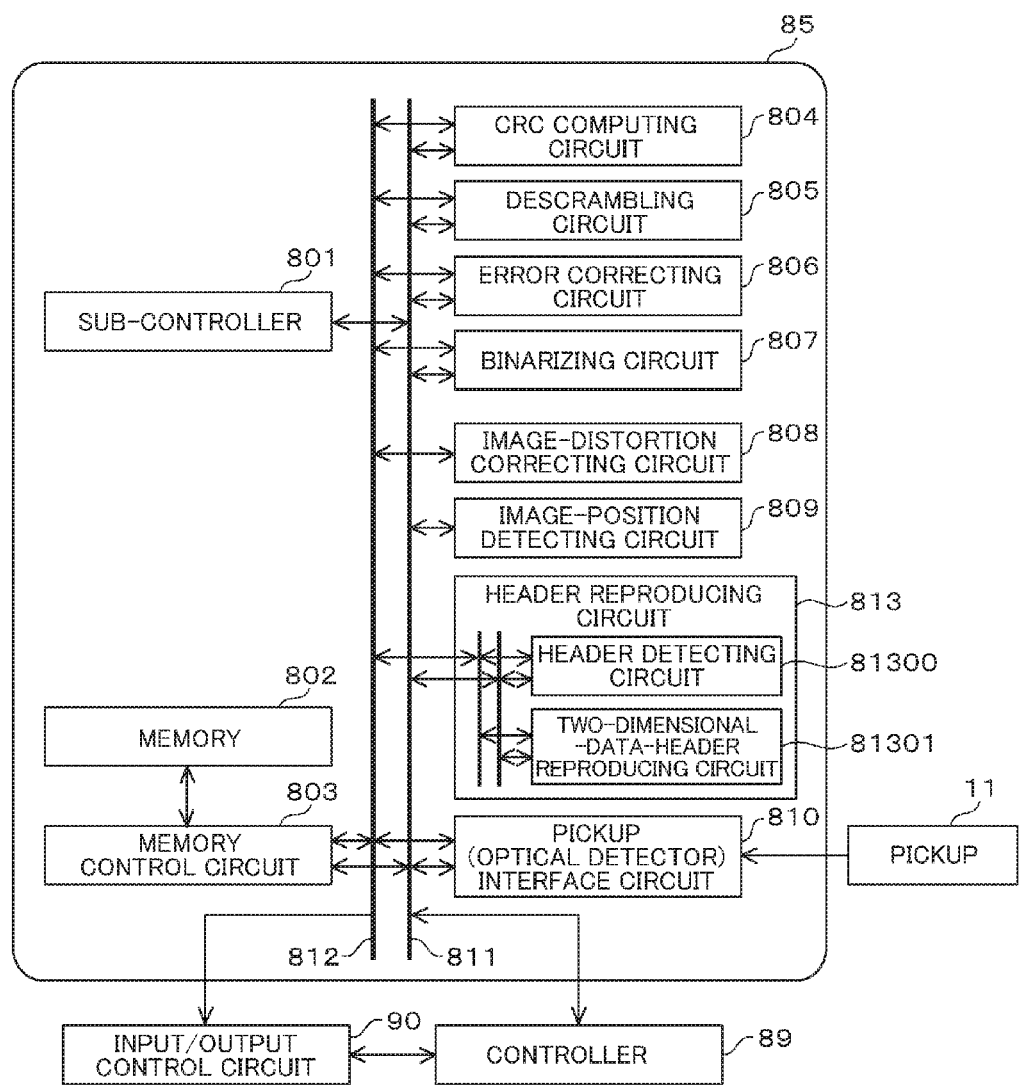
FIG. 8 is an outline drawing showing an embodiment of a signal processing circuit in the optical-information recording/reproducing apparatus.

FIG. 8 is a block diagram of the signal processing circuit 85 of the optical-information recording/reproducing apparatus 10. When the light detector 325 in the pickup 11 detects a signal beam, the controller 89 orders the signal processing circuit 85 to subject the signals corresponding to one sheet of reproduction image data input from the pickup 11 to reproduction processing. The processing order from the controller 89 is notified to a sub-controller 801 in the signal processing circuit 85 through a control line 811. In response to this notification, the sub-controller 801 controls signal processing circuits via the control line 811 so that the signal processing circuits are operated in parallel. First, the control is carried out so that a memory control circuit 803 stores the reproduction image data, which is input from the pickup 11 through a pickup interface circuit 810, in a memory 802 via a data line 812.

When the reproduction image data stored in the memory 802 reaches a certain volume, in a header reproducing circuit 813 comprised of a header detecting circuit 81300 and a two-dimensional-data-header reproducing circuit 81301, the header detecting circuit 81300 detects the two-dimensional data header, and the two-dimensional-data-header reproducing circuit 81301 reproduces the information of the two-dimensional data header such as the type and/or format of recorded data and book number. As a result, if the sub-controller 801 can determine that identification information of the detected information belongs to the two-dimensional data serving as a target of reproduction, the sub-controller 801 carries out control to detect the marker (s) in the reproduction image data, which is stored in the memory 802, and extract an effective data range by an image-position detecting circuit 809. Then, control is carried out to correct distortions such as tilt/magnification/distortion of reproduction image data by using the detected marker by an image-distortion correcting circuit 808 and convert the reproduction image data to an expected two-dimensional data size. Control is carried out to carry out binarization of subjecting each bit data of a plurality of bits constituting the size-converted two-dimensional data to determination of "0" or "1" by a binarizing circuit 807 and store the data in the memory 802 in the order of output of the information. Then, an error(s) contained in each data string is corrected by an error correcting circuit 806, the scrambling, in which the pseudorandom-number data string is added, is descrambled by a descrambling circuit 805, and, then, a CRC computing circuit 804 checks that the information in the memory 802 does not contain an error. Then, the information is transferred from the memory 802 to the input/output control circuit 90.

Figure 10:
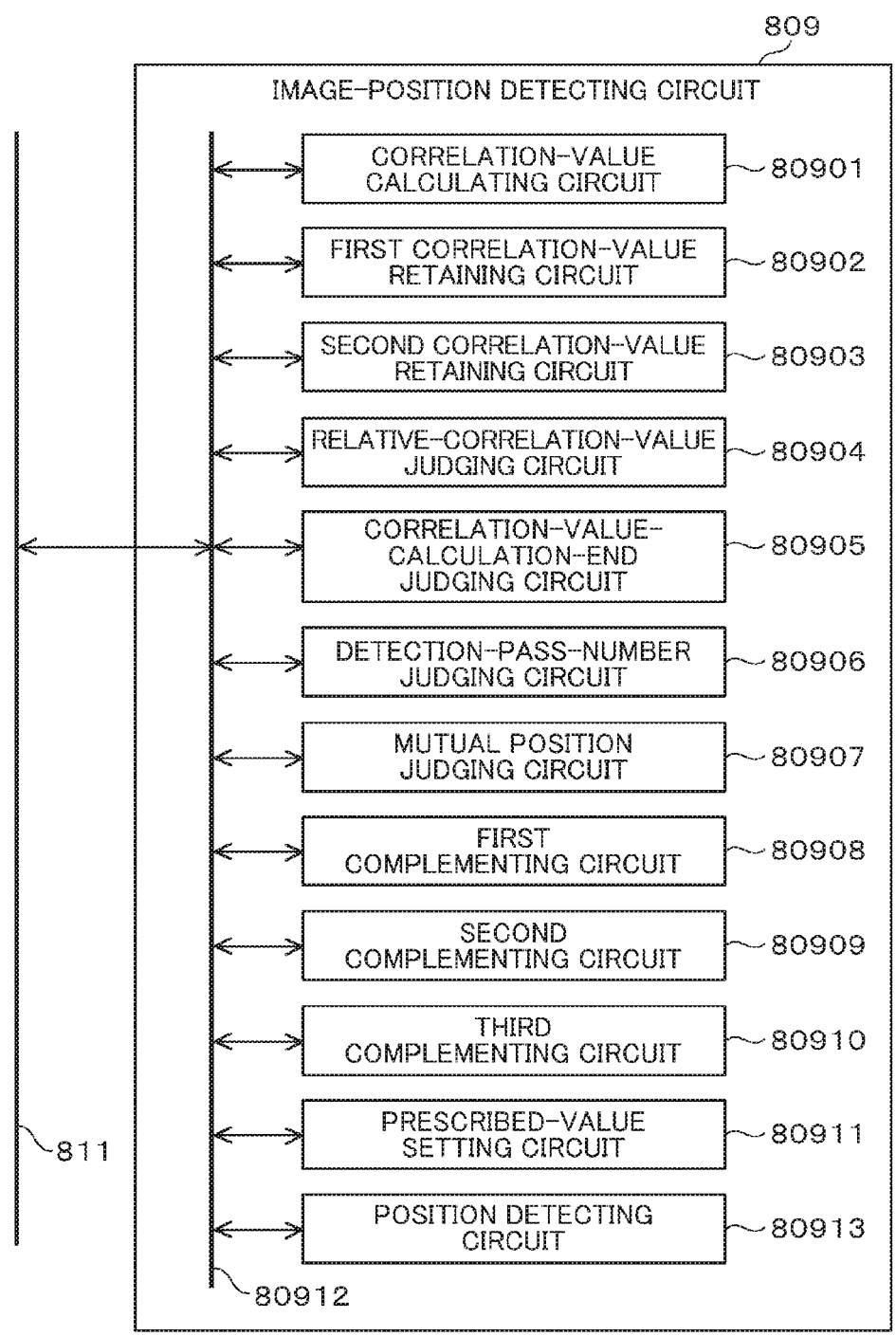
FIG. 10 is an outline drawing showing an embodiment of an image-position detecting circuit in the signal processing circuit.

A configuration of the image-position detecting circuit 809 will be described by using FIG. 10. FIG. 10 shows the configuration of the image-position detecting circuit 809. The position detecting circuit 809 is comprised of: a correlation-value calculating circuit 80901, which calculates correlation values; a first correlation-value retaining circuit 80902, which selects a first correlation value from the correlation values calculated by the correlation-value calculating circuit 80901 and retains the first correlation value; a second correlation-value retaining circuit 80903, which selects a second correlation value from the correlation values calculated by the correlation-value calculating circuit 80901 and retains the second correlation value; a relative-correlation-value judging circuit 80904, which calculates a relative correlation value from the first correlation value and the second correlation value and determines pass/fail of position detection; a correlation-value calculation-end judging circuit 80905, which judges whether the calculations of the relative correlation values have been carried out for all the markers recorded in the reproduction image data; a mutual position judging circuit 80907, which re-determines pass/fail of position detection by mutually comparing the detected positions of the markers judged to have passed the position detection by the relative-correlation-value judging circuit 80904; a position-pass-number judging circuit 80906, which calculates the number of passes of the markers which have been determined to have passed the position detection by the relative-correlation-value judging circuit 80904 and the mutual position judging circuit 80907; a first complementing circuit 80908, which carries out a first complement; a second complementing circuit 80909, which carries out a second complement; a third complementing circuit 80910, which carries out a third complement; a prescribed-value setting circuit 80911, which sets prescribed values about position detection results of the markers; a position detecting circuit 80913, which carries out position detection of reproduction images while using the markers determined to have passed the position detection and complemented markers as references; and a bus 80912, which connects the marker control line 811 and the circuits of 80901 to 80910. Detailed operations of the image-position detecting circuit 809 will be described later.

Figure 6A:
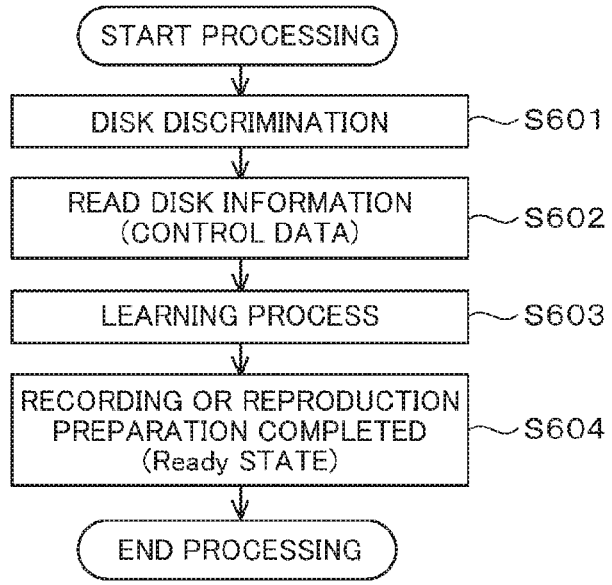
FIGS. 6A to 6C are outline drawings showing an embodiment of an operation flow of the optical-information recording/reproducing apparatus.
Figure 6B:
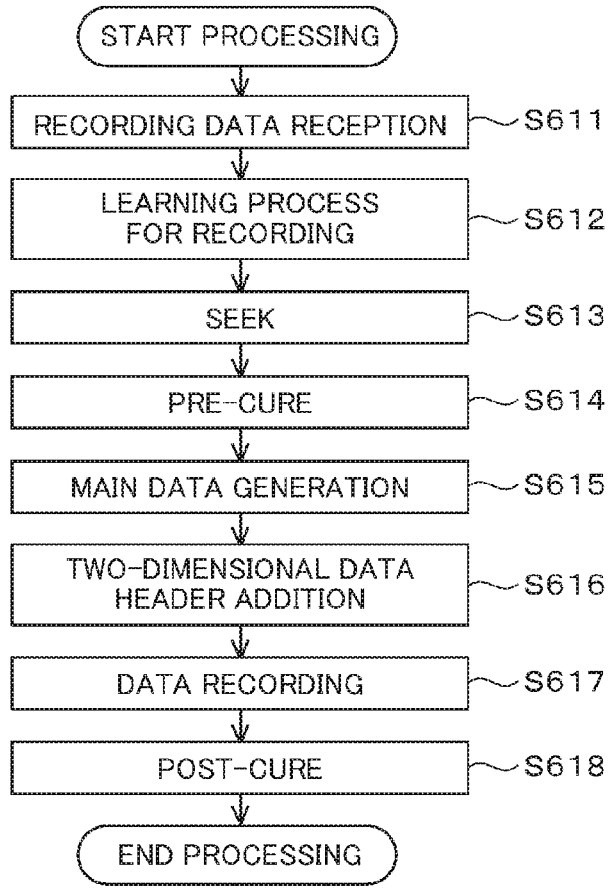
Figure 6C:
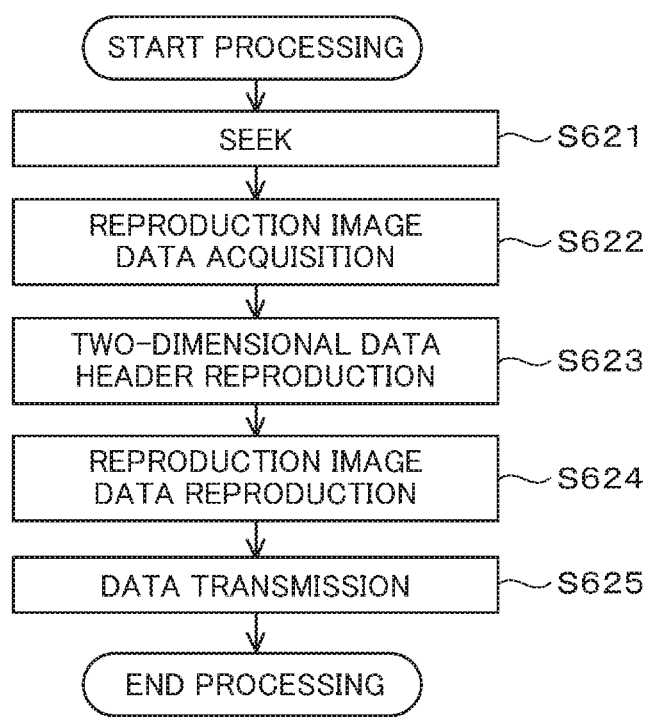

FIGS. 6A to 6C show operation flows of recording and reproducing in the optical-information recording/reproducing apparatus 10. Herein, particularly the flows about recording/reproducing utilizing holography will be described. FIG. 6A shows the operation flow from insertion of the optical-information recording medium 1 into the optical-information recording/reproducing apparatus 10 to completion of preparation of recording or reproducing thereafter, FIG. 6B shows the operation flow from the preparation completed state to recording of information to the optical-information recording medium 1, and FIG. 6C shows the operation flow from the preparation completed state to reproducing of the information recorded in the optical-information recording medium 1.

When the medium is inserted as shown in FIG. 6A, the optical-information recording/reproducing apparatus 10 discriminates, for example, whether the inserted medium is the optical-information recording medium 1 which records or reproduces information by utilizing holography or not (S601). As a result of the medium discrimination, if it is judged to be the optical-information recording medium 1 which records or reproduces information by utilizing holography, the optical-information recording/reproducing apparatus 10 reads control data provided in the optical-information recording medium 1 (S602) and acquires, for example, information about the optical-information recording medium 1 and/or information about various setting conditions in the case of recording or reproducing. After the control data is read, a learning process (S603) about various adjustments corresponding to the control data and/or about the pickup 11 is carried out, and the optical-information recording/reproducing apparatus 10 completes the preparation of recording or reproducing (S604).

In the operation flow from the preparation completed state to recording of information, as shown in FIG. 6B, first, the information to be recorded is received (S611) and is transmitted to the signal generating circuit 86. Then, in accordance with needs, various learning processes for recording such as power optimization of the optical source 301 and optimization of the time of exposure by the shutter 303 are carried out in advance so that a page(s) can be recorded at high quality on the optical-information recording medium 1 (S612). Then, in a seek operation (S613), the access control circuit 81 is controlled to position the positions of the pickup 11 and the cure optical system 13 to predetermined positions of the optical-information recording medium 1. If the optical-information recording medium 1 has address information, the address information is reproduced, and whether it is positioned at a target position or not is checked. If it is not disposed at the target position, an operation of calculating a mismatched amount from the predetermined position and carrying out positioning again is repeated.

Then, a predetermined region is pre-cured by using an optical beam output from the cure optical system 13 (S614), the signal generating circuit 86 carries out a two-dimensional-data generating process including main data generation of converting the information to be recorded to two-dimensional data (S615) and two-dimensional data header addition (S616), the generated two-dimensional data is transmitted to the spatial light modulator 312 in the pickup 11, and the information is recorded as two-dimensional data by using a reference beam and a signal beam output from the pickup 11 (S617). After the two-dimensional data is recorded, post-cure is carried out by using an optical beam output from the cure optical system. 13 (S618). In accordance with needs, the recorded two-dimensional data may be verified.

The main data is the part making up most of the two-dimensional data and mainly stores the information transferred from the external control device 91. Other than this information, a table, which shows the correspondence between logical addresses handled by the external control device 91 in particular two-dimensional data and the positions of each two-dimensional data in the optical-information recording medium 1, and a replacement position list, which shows the correspondence of the positions of two-dimensional data before replacement and after replacement in a replacing process of the two-dimensional data which is difficult to be reproduced due to a defect(s), may be stored.

The two-dimensional data header is two-dimensional data for storing information such as the type and/or the data format of the data recorded in the two-dimensional data and addresses for identifying the two-dimensional data recorded by multiplexing, and the main data is recording information in the two-dimensional data. Detailed operations of the main data generation (S615) and the two-dimensional data header addition (S616) will be described later.

In the operation flow from the preparation completed state to reproducing of the recorded information, as shown in FIG. 6C, first, in a seek operation (S621), the access control circuit 81 is controlled to position the positions of the pickup 11 and the reproducing reference-beam optical system 12 to predetermined positions of the optical-information recording medium. If the optical-information recording medium 1 physically has physical address information, the physical address information is reproduced, and whether it is positioned at a target position or not is checked. If it is not disposed at the target position, an operation of calculating the mismatched amount from the predetermined position and carrying out positioning again is repeated. If the optical-information recording medium 1 does not physically have physical address information, the rotation angle of the optical-information recording medium 1 and the radial-direction position of the pickup 11 are detected by using the disk-rotation-angle detecting optical system 14 and the access control circuit 81, the mismatched amount from the target position is calculated, and the pickup 11 is operated in the direction to reduce the mismatched amount, thereby carrying out predetermined positioning.

Subsequently, a reference beam is output from the pickup 11, reproduction image data which is the information recorded in the optical-information recording medium is acquired (S622), and, after reproduction of a two-dimensional data header part in the reproduction image data (S623), the reproduction image data is reproduced (S624) and transmitted (S625). If the reproduction image data serving as a target is not identified as a result of the reproduction of the two-dimensional data header part (S623), there is a possibility that reproduction image data different from the target is detected, and, therefore, the process is stopped without carrying out transmission of the data (S625) or the process is executed again from the process of (S621). Detailed operations of the two-dimensional data header reproduction (S623) and the main data reproduction (S624) will be described later.

Figure 9A:
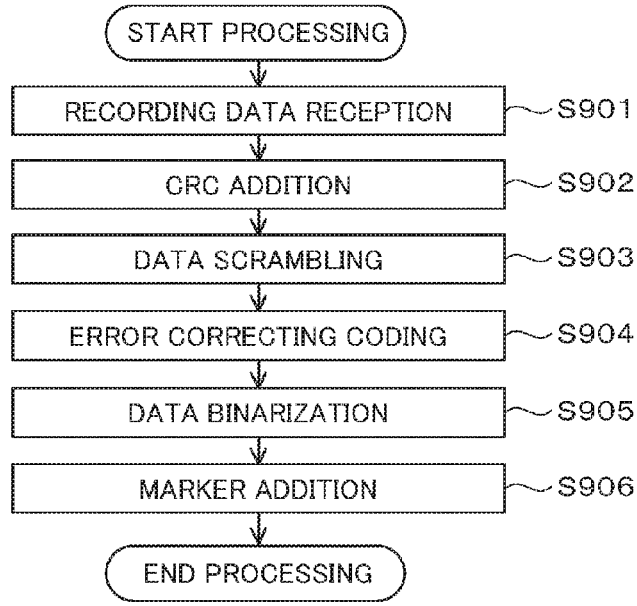
FIGS. 9A and 9B are outline drawings showing an embodiment of an operation flow of the signal generating/processing circuit.
Figure 9B:
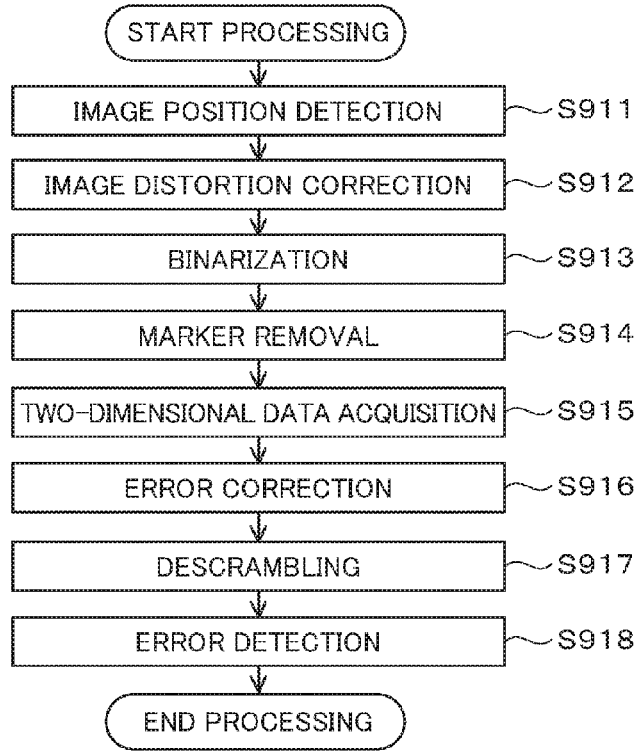

FIG. 9A and FIG. 9B show data processing flows in the cases of recording and reproducing. FIG. 9A shows the detailed process flow of the main data generation (S615) in the two-dimensional data generation of the signal generating circuit 86, which generates two-dimensional data corresponding to record data. FIG. 9B shows the detailed process flow of the reproduction image data reproduction (S624) in the signal processing circuit 85 in the flow before main-data transmitting process in the input/output control circuit 90 after the reproduction image data of the two-dimensional data is detected by the light detector 325.

Data processing in the case of recording will be described by using FIG. 9A. The processes from S901 to S906 correspond to the processes in the main data generation (S615) in the process of FIG. 6B. If the signal generating circuit 86 receives the information (S901), each data string is subjected to CRC (S902) so that error detection can be carried out when the data is divided into a plurality of data strings and reproduced, the data strings are subjected to scrambling (S903) of adding pseudorandom-number data strings to the data strings in order to approximately equalize the number of on-pixels and the number of off-pixels and prevent repetition of the same patterns, and, then, error correcting coding of, for example, Reed-Solomon code is carried out (S904) so that error correction can be carried out in the case of reproducing. Then, the modulated data strings are converted to two-dimensional data, and it is repeated by the amount of the two-dimensional data corresponding to one sheet, thereby forming two-dimensional data corresponding to one sheet (S905). The marker (s) serving as a reference in the image position detection and the image distortion correction in the case of reproducing is added to the two-dimensional data formed in this manner (S906), a two-dimensional header is added thereto (S616), and, then, the data is transferred to the spatial light modulator 312 (S617).

Next, the data processing flow in the case of reproducing will be described by using FIG. 9B. The processes from S911 to S918 correspond to the process of the data reproducing (S624) in the process of FIG. 6C. The reproduction image data detected by the light detector 325 is transferred to and acquired by the signal processing circuit 85 (S622), and the two-dimensional data header is detected from the detected reproduction image data. Then, the two-dimensional data header is reproduced (S623), and the data stored in the two-dimensional data header is acquired. Then, the image position is detected while using the marker (s) contained in the reproduction image data as a reference (S911), distortion correction of the tilt/magnification/distortion, etc. of the image is carried out (S912), then, a binarization process is carried out (S913), and the marker is removed (S914), thereby acquiring the two-dimensional data corresponding to one page (S915). After the two-dimensional data obtained in this manner is converted to a plurality of data strings, an error correcting process is carried out (S916) to remove parity data strings. Then, a descrambling process (S917) is carried out, an error detecting process by CRC is carried out (S918) to remove CRC parities, and, then, the information is transmitted through the input/output control circuit 90 (S625). Note that, if it is expected that the image position detection by the marker (S911) can be carried out more easily than the reproducing of the two-dimensional data header (S623), the order of these processes may be switched, and the search of the two-dimensional data header may be carried out by using the result of the image position detection using the marker. The result of the detection of the two-dimensional data header by the two-dimensional data header reproducing (S623) may be used in the image position detection by using the marker (S911). When the result of the two-dimensional data header detection is used in the image position detection using the marker (S911), a computing-volume reducing effect and a position-detection-range expanding effect of the image position detection (S911) can be expected. Detailed operations of the image position detection using the marker (S911) will be described later.

Detailed operations of the process of the image position detection (S911) carried out by the image-position detecting circuit 809 will be described by using FIG. 1.

Figure 1:
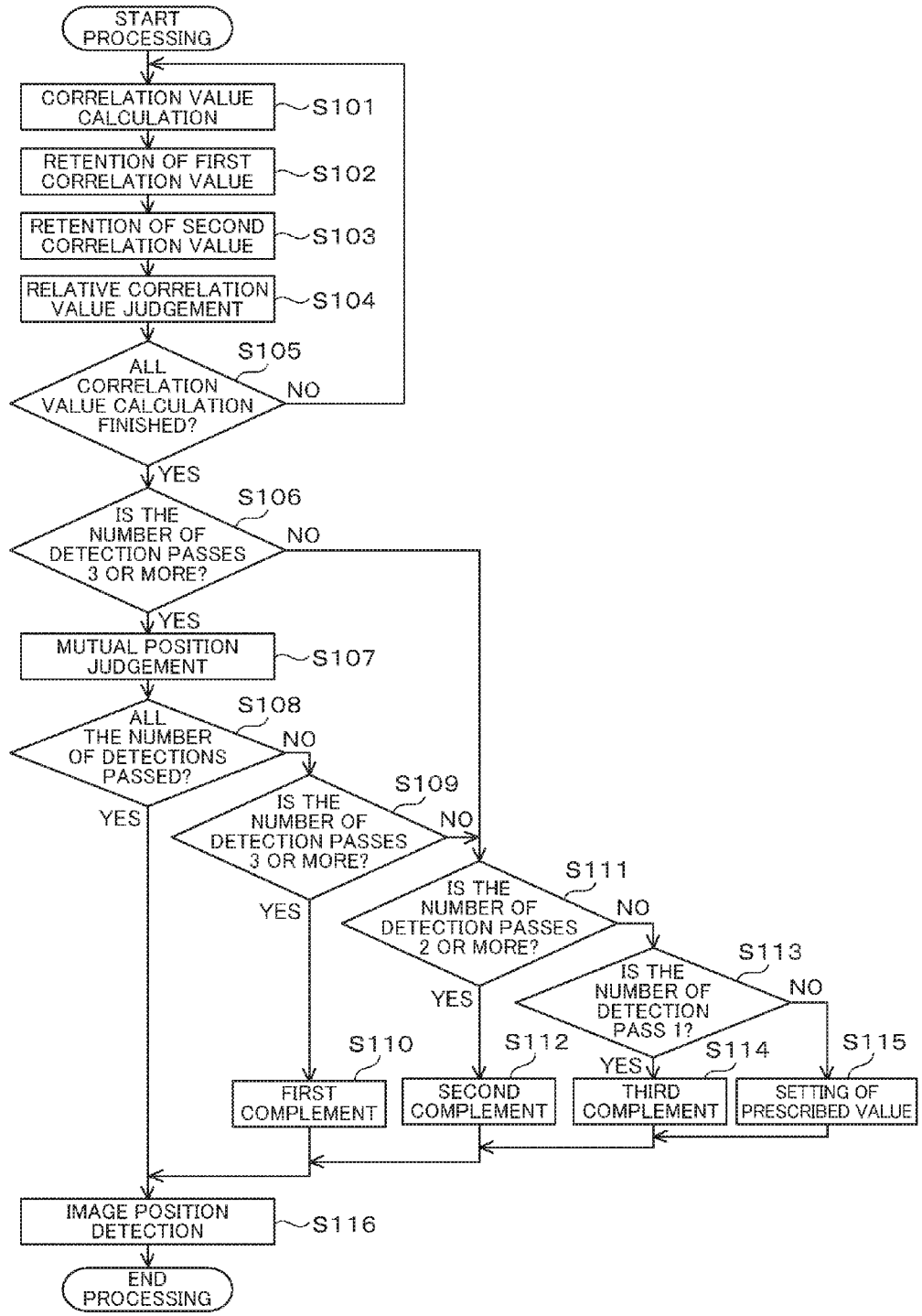
FIG. 1 is a flow chart showing operation of an image-position detecting circuit according to the present invention.

FIG. 1 is a detailed flow chart of the image position detection (S911) processed by the image-position detecting circuit 809.

The correlation-value calculating circuit 80901 is retaining an ideal shape of the marker, sets a plurality of calculation ranges in a search range in which the markers of the reproduction image data can exist, and calculates correlation values of the ideal shape of the markers and the calculation ranges in accordance with the number of the set calculation ranges (S101). The first correlation-value retaining circuit 80902 and the second correlation-value retaining circuit 80903 respectively carry out retention of the first correlation value (S102) and retention of the second correlation value (S103) from among the calculated correlation values. The relative-correlation-value judging circuit 80904 calculates a relative correlation value from the first correlation value and the second correlation value retained and judges whether the calculated relative correlation value is equal to or more than the prescribed value or less than the prescribed value. If the relative correlation value is equal to or more than the prescribed value, the relative-correlation-value judging circuit 80904 retains the position of the calculation range from which the first correlation value is calculated as a marker detected position and increments the number of detection passes (S104). Note that detailed operations from S101 to S104 will be described later.

In S105, the correlation-value calculation-end judging circuit 80905 judges whether the processes from S101 to S104 have been finished for all the markers retained in the reproduction image data or not. If the processes from S101 to S104 have been finished for all the markers, the correlation-value calculation-end judging circuit 80905 executes the process of S106. If the processes from S101 to S104 have not been finished for all the markers, the correlation-value calculation-end judging circuit 80905 executes the processes from S101 to S104 for the markers for which the processes have not been finished.

In S106, the detection-pass-number judging circuit 80906 switches subsequent processes by using the number of detection pass(es) counted in S104. If the number of detection passes is three or more, the process of S107 is executed; and, if the number of detection passes is less than 3, the process of S111 is executed. In S107, the mutual position judging circuit 80907 relatively compares the marker detected positions, which have passed the detection, and re-determines the marker detected position(s) which is judged to be mismatched in positional relation as detection fail; and the result of subtracting the number of fail determinations from the number of detection passes by the detection-pass-number judging circuit 80906 is set as the new number of detection passes. Detailed operations of the mutual position judgement of S107 will be described later.

In S108, the detection-pass-number judging circuit 80906 compares the number of the markers retained by the reproduction image data and the number of detection passes. If the number of the markers retained by the reproduction image data matches the number of detection passes, a transition to the process of S116 is made. If the number of the markers retained by the reproduction image data does not match the number of detection passes, the process of S109 is executed.

In S109, the detection-pass-number judging circuit 80906 judges whether the number of detection passes is three or more. If the number of detection passes is three or more, the first complementing circuit 80908 executes a first complement (S110), and a transition to the process of S116 is made. If the number of detection passes is not three or more, the process of S111 is executed. Detailed operations of the first complement (S110) will be described later.

In S111, the detection-pass-number judging circuit 80906 judges whether the number of detection passes is two. If the number of detection passes is two, the second complementing circuit 80909 executes a second complement (S112), and a transition to the process of S116 is made. If the number of detection passes is not two, the process of S113 is executed. Detailed operations of the second complement (S112) will be described later.

In S113, the detection-pass-number judging circuit 80906 judges whether the number of detection passes is one. If the number of detection pass is one, the third complementing circuit 80910 executes a third complement (S114), and a transition to the process of S116 is made. If the number of detection passes is not one, the prescribed-value setting circuit 80911 sets predetermined values for the detection results of all the markers (S115), and a transition to the process of S116 is made. Detailed operations of the third complement (S114) will be described later. In S116, the position detecting circuit 80913 detects an image position while using the detected markers and the complemented marker(s) as references, and the image position detection S911 is finished.

Note that, in the operation of the image position detection S911 shown in FIG. 1, the number of the markers recorded in the reproduction image data is desired to be three or more in order to detect the position and distortion of the reproduction image data. However, even in a case in which the number of recorded markers is less than 3, in accordance with the flow chart shown in FIG. 1, the process is executed so that the total of the number of the complemented markers and the number of the detection-passed markers is three or more by carrying out the second complement (S112), the third complement (S114), or the setting of the prescribed value (S115).

The detailed process of the correlation value calculation (S101) will be described by using FIG. 11. FIG. 11 is a conceptual drawing of a correlation-value calculating method.

In FIG. 11, the search range in which the marker(s) of the reproduction image data can exist is represented by 1101, the calculation range is represented by 1102, the state of setting the calculation range is represented by 1103, the marker recorded in the reproduction image data is represented by 1104, and the ideal shape of the marker retained by the image-position detecting circuit 809 is represented by 1105.

The correlation value calculation is calculated by using the calculation range 1102 and the marker ideal shape 1105. As a detailed correlation-value calculating method, for example, the search range 1101 is to be binarized by, for example, median values or average values, and the total of the numbers of matches of the locations and states of on-pixels/off-pixels of the calculation range 1102 and the marker ideal shape 1105 may be used as the correlation value; or the on-pixel of the marker ideal shape 1105 is set as "+1", the off-pixel thereof is set as "−1", the pixels at the same positions in the calculation range 1102 and the marker ideal shape 1105 are multiplied with each other, and, then, the sum of the obtained values may be used as the correlation value. As long as it is a method capable of calculating the matching degree of the locations and the states of the on-pixels/off-pixels of the calculation range 1102 and the marker ideal shape 1105, the method of calculating the correlation value is not limited. Then, the calculation range 1102 is set to be, for example, moved by one pixel at a time in the direction of an arrow of 1103. After an end of the search range 1101 and an end of the calculation range 1102 match, the calculation range 1102 is moved in a column direction, the calculation range 1102 is set in all the pixels in the search range 1101, and every time the calculation range is set, the correlation value is calculated by the above described method. Note that, the setting order of the calculation range 1102 is not limited, the setting of the calculation range 1103 may be set with movement by a plurality of pixels at each time, or the calculation range 1103 may be set only in part in the search range.

Figure 5:
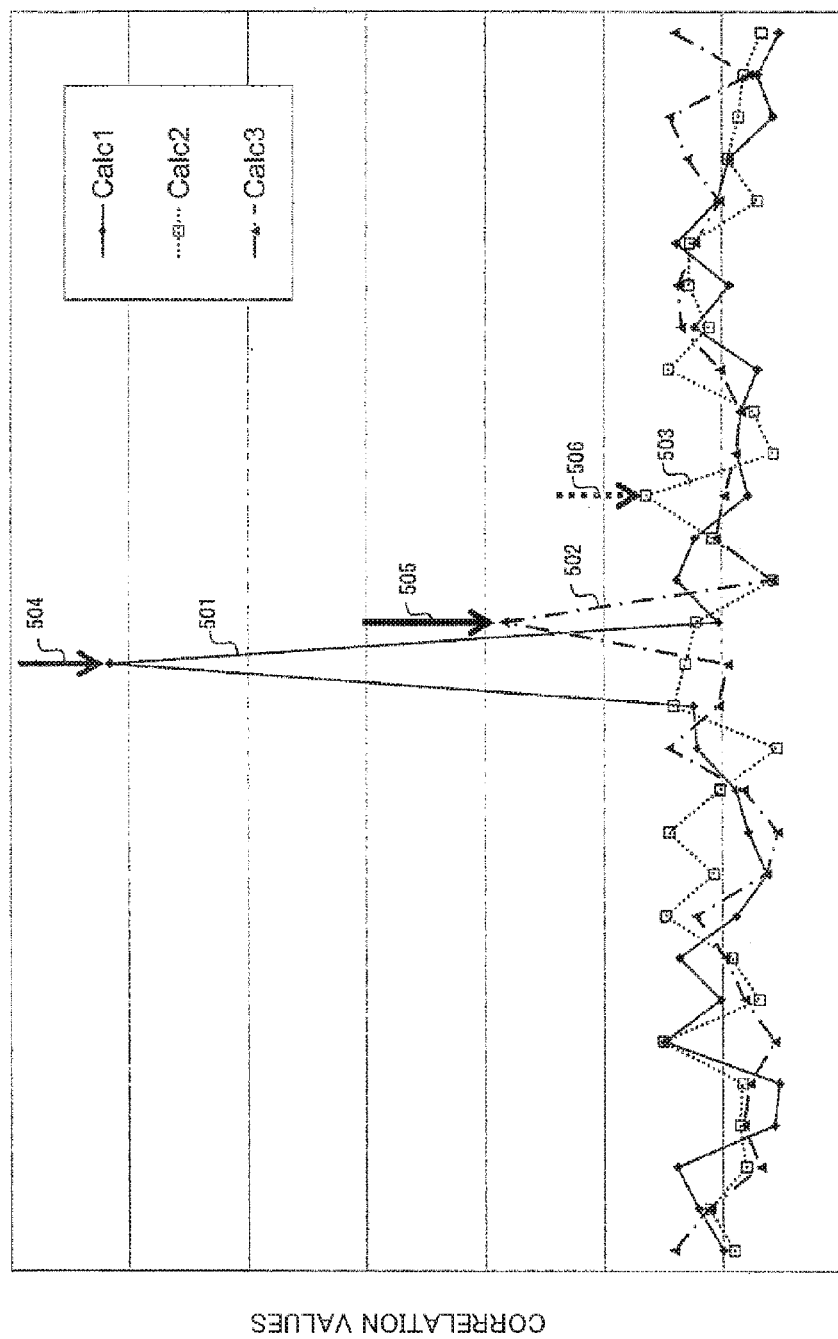
FIG. 5 is an explanatory drawing showing a method of calculating relative correlation values according to the present invention.

The detailed processes of the retention of the first correlation value (S102), the retention of the second correlation value (S103), and the relative correlation-value judgement (S104) will be described by using FIG. 5. A horizontal axis of FIG. 5 shows the set positions of the calculation range 1102, a vertical axis thereof shows correlation values, and FIG. 5 shows the state of the correlation values changed depending on the set positions of the calculation range 1102. FIG. 5 shows, as examples, transitions of the correlation values with respect to three markers; wherein the transitions of the correlation values ideally detecting the marker are represented by 501 (hereinafter, denoted as calc1), the transitions of the correlation values in a case in which an available largest correlation value is reduced due to, for example, aging deterioration of the optical source 301, distortion of the marker, etc. are represented by 502 (hereinafter, denoted as calc2), and the transitions of the correlation values which are obtained when the marker is not detected due to, for example, a defect of an optical part, dust on the optical-information recording medium 1, etc. are represented by 503 (hereinafter, denoted as calc1). Peaks of the correlation values obtained during the transitions of the correlation values of 501 to 503 are represented by 504 to 506, respectively.

As shown by calc1, the transitions of the ideally detected correlation value show the extremely high correlation value 504 only when the shape of the calculation range 1102 matches the marker ideal shape 1105. However, depending on the obtained reproduction image, as shown by calc2, the correlation largest value 505 sometimes becomes a low value compared with the correlation largest value 504. In a marker-undetectable image with a defect, as shown by the correlation largest value 506 of calc1, the correlation value which is not largely different compared with other correlation values is sometimes shown. In the case of calc3, if the process thereafter is brought forward by using the correlation largest value 506 as the detection position of the marker, data is not normally reproduced since the detection position of the marker is wrong. Therefore, in the position detection by calc3, the process thereafter has to be brought forward with marker-position-detection fail.

Then, the relative-correlation-value judgement (S104) is carried out to carry out the pass/fail determining process of the marker detection position results. When the relative-correlation-value judgement (S104) is carried out, the retention of the first correlation value (S102) and the retention of the second correlation value (S103) are carried out. The retention of the first correlation value (S102) is a process of retaining a largest correlation value among all the correlation values calculated by setting the calculation range 1102 in all the range of the search range 1101. The retention of the second correlation value (S103) is a process of retaining a second largest value among all the correlation values calculated by setting the calculation range 1102 in all the range of the search range 1101. Then, in the relative-correlation-value judgement (S104), the difference between the first correlation value and the second correlation value is calculated as the relative correlation value, the position detection of the corresponding marker is judged as a pass if the calculated relative correlation value is exceeding a predetermined reference value, and the position detection of the corresponding marker is judged as fail if the calculated relative correlation value is lower than the predetermined reference value.

Note that the first correlation value is the largest correlation value among all the correlation values calculated by setting the calculation range 1102 in all the range of the search range 1101. However, the first correlation value is not limited thereto, but, for example, may be a correlation value which is as large as a predetermined order, or the correlation value as large as a predetermined order among the correlation values calculated in a predetermined range instead of all the range of the search range 1101 may be used as the first correlation value.

The second correlation value is the second largest value among all the correlation values calculated by setting the calculation range 1102 in all the range of the search range 1101. However, the second correlation value is not limited thereto, and the second correlation value, for example, may be an average value or a median value of all the correlation values calculated by setting the calculation range 1102 in all the range of the search range 1101 or may be a correlation value as large as a predetermined order.

The relative correlation value is the difference between the first correlation value and the second correlation value, but may be a quotient, and the relative correlation value is not limited thereto as long as it is a value about a relative value of the first relative value and the second relative value.

Figure 12A:
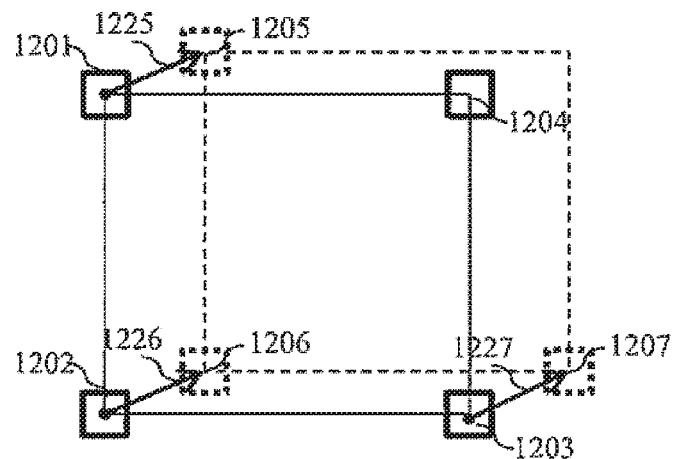
FIGS. 12A to 12D are explanatory drawings showing a method of processing mutual position judgement according to the present invention.
Figure 12B:
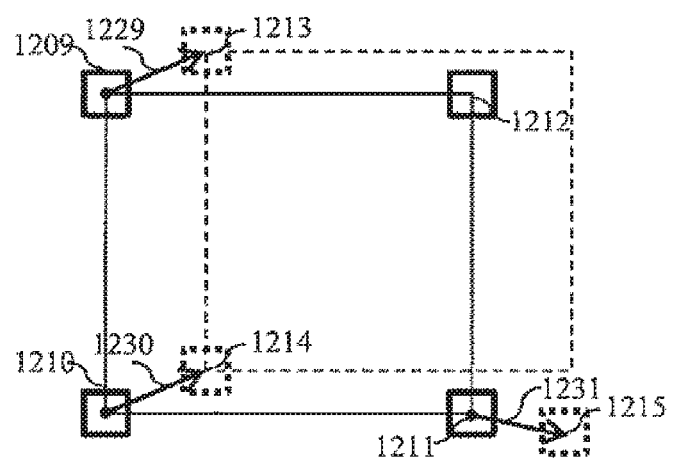
Figure 12C:
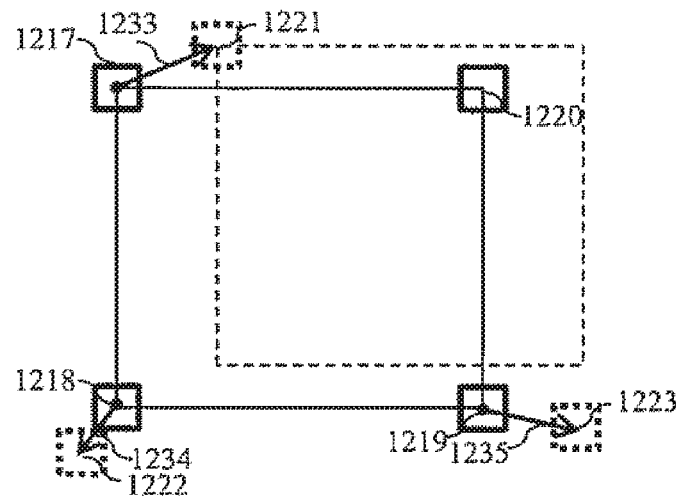

The detailed operations of the mutual position judgement (S107) will be described by using FIGS. 12A to 12D. FIGS. 12A to 12C are drawings showing mismatches from ideal states of detection positions about three detection-passed markers. The detected positions of detection-passed markers of the cases in which the reproduction image data does not have positional mismatches (hereinafter, denoted as ideal state) are represented by 1201 to 1204, 1209 to 1212, and 1217 to 1220. An example of the detected positions of detection-passed markers of the cases in which the reproduction image data has positional mismatches are represented by 1205 to 1207, 1213 to 1215, and 1221 to 1223. Positional mismatch vectors from the detected positions of the detection-passed markers in ideal states to the detected positions of the detection-passed markers of the cases in which the reproduction image data has positional mismatches are represented by 1225 to 1227, 1229 to 1231, and 1233 to 1235.

The mutual position judgement (S107) is a process in which, if the detected position of an arbitrary detection-passed marker has different characteristics compared with the detected positions of other detection-passed markers, an erroneous detection is judged to judge detection fail. The characteristics of the detected position of the detection-passed marker is judged by the direction and size of the positional mismatch vector. Depending on whether the arbitrary positional mismatch vector is within a direction allowable amount and a size allowable amount of a mismatch determined in advance or not with respect to the other positional mismatch vectors, which are comparison targets, match or mismatch of the characteristics of the detected positions of the detection-passed markers is mutually judged.

For example, in FIG. 12A, all of the positional mismatch vectors 1225 to 1227 of the detection-passed markers are directed toward the same direction, and all of the positional-mismatch amounts thereof are the same; therefore, all of the detection-passed markers 1205 to 1207 are judged to have been correctly detected since the detected position of the arbitrary detection-passed marker has the same characteristics as the detected positions of the other detection-passed markers.

In FIG. 12B, since only the positional mismatch vector 1231 shows a detection result of different characteristics compared with the other positional mismatch vectors 1229 to 1230, it is judged that only the position detection result 1215 of the detection-passed marker has been erroneously detected, and it is judged that the position detection results 1213 to 1214 of the detection-passed markers have been correctly detected.

In FIG. 12C, all of the positional mismatch vectors 1233 to 1235 of the detection-passed markers have mutually different characteristics. In this case, it may be judged that all of the position detection results 1221 to 1223 are erroneously detected, or it may be judged that one arbitrary position detection result is correctly detected while the others are erroneously detected.

Figure 12D:
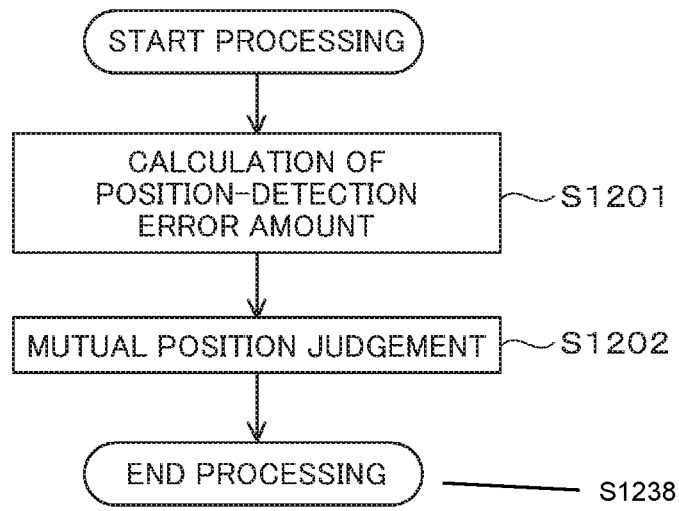

Then, the flow of the process of the mutual position judgement (S107) will be described by using FIG. 12D. In the mutual position judgement (S107), the position-detection error amounts are calculated by calculating the positional mismatch vector amounts of the detection-passed marker positions from the ideal state (S1201), and, then, if the detected position of an arbitrary detection-passed marker has different characteristics compared with the detected positions of the other detection-passed markers, it is judged that the detection-passed marker is erroneously detected, and the process is finished (S1238).

Note that, FIGS. 12A to 12D describe only the examples of parallel movement about the positional mismatches of the reproduction image data. However, other than that, positional mismatches of the reproduction image data due to expansion, contraction, distortion, etc. are also conceivable, and, in such cases, the directions of the positional mismatch vectors do not become the same direction. Therefore, the characteristics of the positional mismatch vectors of the markers caused by expansion, contraction, and/or distortion are also retained in advance, and the mutual position judgement S107 is processed also in consideration of the positional mismatch vectors of the detection-passed markers caused by expansion, contraction, and/or distortion.

In the end, the detailed operations of the first complement (S110), the second complement (S112), and the third complement (S114) will be described by using FIG. 13(a) to FIG. 13(f).

FIG. 13(a) is a drawing showing a mismatch of marker detected positions from the ideal state before the first complement, FIG. 13(b) is a drawing showing mismatches of marker detected positions from the ideal state before the second complement, FIG. 13(c) is a drawing showing mismatches of marker detected positions from the ideal state before the third complement, FIG. 13(d) is a drawing showing mismatches of the marker detected positions from the ideal state after the first complement, FIG. 13(e) is a drawing showing mismatches of the marker detected positions from the ideal state after the second complement, and FIG. 13(f) is a drawing showing mismatches of the marker detected positions from the ideal state after the third complement.

The detected positions of the detection-passed markers in the ideal state (hereinafter, described as ideal marker positions) are represented by 1301 to 1304, 1313 to 1316, and 1325 to 1328; the detected positions of the detection-passed markers (hereinafter, described as detected marker positions) are represented by 1305 to 1307, 1317 to 1318, and 1329; and the positional mismatch vectors to the detected positions of the detection-passed markers in the cases in which there are positional mismatches in the reproduction image data from the detected positions of the detection-passed markers in the ideal state are represented by 1309 to 1311, 1321 to 1322, and 1333; the detected positions of the markers judged as erroneous detections which are obtained by complementing from the detected positions of the detection-passed markers (hereinafter, described as complemented marker positions) are represented by 1308, 1319 to 1320, and 1330 to 1332; and the positional mismatch vectors of the markers judged as detection fail which are obtained by complementing from the positional mismatch vectors of the detection-passed markers (hereinafter, described as complemented positional-mismatch vectors) are represented by 1312, 1323 to 1324, and 1334 to 1336.

The first complement shown in FIG. 13(a) and FIG. 13(d) is a complement carried out when three or more markers are judged as position detection passes, wherein the complemented positional-mismatch vector 1312 is calculated by using the positional mismatch vectors 1309 to 1311, and the complemented marker detected position of 1308 is calculated. In the first complement, the complemented positional-mismatch vector 1312 may be calculated as an average value, an addition value, or a subtraction value of all the positional mismatch vector among the positional mismatch vectors of the detection-passed markers; an arbitrary one of the positional mismatch vectors of the detection-passed markers may be used as the complemented positional-mismatch vector 1312; and arbitrary positional mismatch vectors of the markers which have passed detections by each component in a row direction and a column direction may be used as the complemented positional-mismatch vector 1312; or arbitrary positional mismatch vectors of the markers which have passed detections by each component may be selected and subjected to computation such as averaging, adding, or subtracting to calculate the complemented positional-mismatch vector 1312. The method of calculating the complemented positional-mismatch vector from the positional mismatch vectors of the detection-passed markers is not limited.

The second complement shown in FIG. 13(b) and FIG. 13(e) is a complement carried out when two markers are judged as detection passes, wherein the complemented positional-mismatch vectors 1323 to 1324 are calculated by using the positional mismatch vectors 1321 to 1322, and the complemented marker positions of 1319 to 1320 are calculated. In the second complement, as well as the first complementing method, the complemented positional-mismatch vectors 1323 to 1324 may be calculated as average values, addition values, or subtraction values of all the positional mismatch vectors among the positional mismatch vectors of the detection-passed markers; an arbitrary one of the positional mismatch vectors of the detection-passed markers may be used as the complemented positional-mismatch vector 1323 or 1324; and arbitrary positional mismatch vectors of the markers which have passed detections by each component in the row direction and the column direction may be used as the complemented positional-mismatch vector 1323 or 1324; or arbitrary positional mismatch vectors of the markers which have passed detections by each component may be selected and subjected to computation such as averaging, adding, or subtracting to calculate the complemented positional-mismatch vector 1323 or 1324. The method of calculating the complemented positional-mismatch vector from the positional mismatch vectors of the detection-passed markers is not limited.

In the second complement, the positional mismatches of the reproduction image data have to be complemented from the two detection-passed markers. Since at least a two-dimensional plane is specified by three points on the plane, if the complemented marker positions in the reproduction image data are calculated from the detected positions of the two detection-passed markers, position detection accuracy is reduced. Therefore, when the complemented positional-mismatch vectors of the markers judged as erroneous detections are to be calculated from the detection-passed markers, predetermined coefficient vectors may be multiplied by the complemented positional-mismatch vectors 1323 to 1324 calculated by the above described method.

The third complement shown in FIG. 13(c) and FIG. 13(f) is a complement carried out when one marker is judged to have passed the position detection; wherein the complemented positional-mismatch vectors 1334 to 1336 are calculated by using the positional mismatch vector 1333, and the complemented marker detected positions of 1330 to 1332 are calculated. In the third complement, the positional mismatch vector of the detection-passed marker may be applied to the complemented positional-mismatch vectors 1334 to 1336; or a plurality of coefficient vectors which have taken the positional relation between the detected position of the detection-passed marker and the complemented marker positions into consideration are prepared in advance, the plurality of coefficient vectors are subjected to selection for each of the complemented marker positions, and the complemented positional-mismatch vectors 1334 to 1336 may be calculated by using the selected coefficient vector and the detection-passed positional mismatch vector.

Note that FIGS. 13A to 13F describe only the examples of parallel movement about the positional mismatches of the reproduction image data. However, other than that, positional mismatch of the reproduction image data caused by expansion, contraction, distortion, etc. are also conceivable, and, in such a case, the directions of the positional mismatch vectors do not become the same direction. Therefore, each complementing process is executed in consideration of the positional mismatch vectors caused by expansion, contraction, and/or distortion. Particularly, in the first complement, since the three or more markers have passed the position detection, the degrees of the expansion, contraction, and/or distortion can be calculated from the detection-passed markers, and the complemented positional-mismatch vector 1312 is complemented by utilizing the calculated degree(s) of expansion, contraction, and/or distortion in a case of complementing.

In this manner, in the reproducing of the reproduction image data, data can be accurately reproduced even in a case of reproduction imaged data with a defect(s) by calculating the correlation values of the reproduction images of the markers retained on the reproduction image data and the ideal shape, retaining the first and second correlation values from the calculated correlation values, calculating the relative correlation value from the retained two correlation values, determining detection pass/fail of the markers according to the calculated relative correlation value, then carrying out the mutual position judgement with respect to the markers which have judged to have passed the detection, and, if the marker(s) judged as erroneous detection(s) exists, calculating the complemented marker position(s).

Second Embodiment

An outline of a reproduction-data processing method in a second embodiment will be described by using FIG. 14 and FIG. 15.

The points that the second embodiment is different from the first embodiment are that a position-detection-result retaining circuit 815 is provided and that the image-position detecting circuit 809 retains the positions of detected or complemented markers and image position detection is carried out by using the retained positions of the markers. Hereinafter, only the points different from the first embodiment will be described.

FIG. 14 is a block diagram of the signal processing circuit 85 of the optical-information recording/reproducing apparatus 10 in the second embodiment. The position-detection-result retaining circuit 815 retains the positions of the markers detected or complemented by the image-position detecting circuit 809 and carries out image position detection by using the retained position of the marker.

Figure 15:
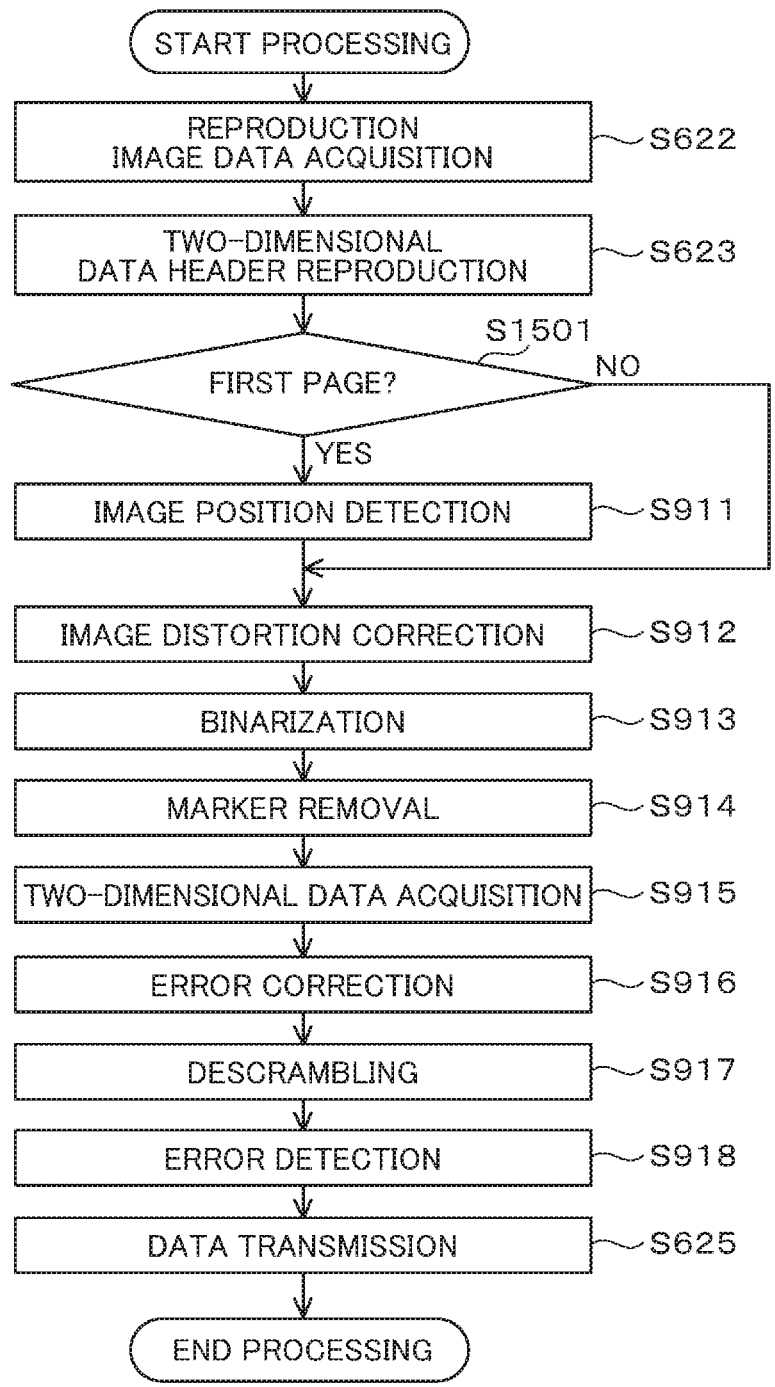
FIG. 15 is an outline drawing showing an embodiment of an operation flow of the signal processing circuit.

FIG. 15 shows a detailed process flow in the signal processing circuit 85 in the second embodiment. After the two-dimensional data header reproduction (S623), in S1501, whether the reproduction image is a first page or not is judged. If the reproduction image is the first page, the image position detection (S911) is carried out. If the reproduction image is not the first page, the position-detection-result retaining circuit 815 carries out image position detection by using the positions of the markers of the retained first page and carries out the process of the image distortion correction (S912) by using the result thereof.

Note that, in the judgement of S1501, the process is switched depending on whether the reproduction image is the first page or not. However, the criterion for switching the process is not limited to whether it is the first page or not, but may be an arbitrary page. Furthermore, instead of the page, the book thereof may be judged to switch the process. The number of the positions of the detected markers which can be retained by the position-detection-result retaining circuit 815 is not limited, and the positions of the detected markers corresponding to the amount of a single page, corresponding to the amount of a plurality of pages, or corresponding to the amount of a plurality of books may be retainable. When position detection is to be carried out by using the positions of the markers corresponding to the amount of the plurality of pages or corresponding to the amount of the plurality of books retained by the position-detection-result retaining circuit 815, which position of the marker is to be used may be judged depending on the reproduced page to use that in position detection.

In this manner, when the position detection of the currently-reproduced reproduction image data is carried out by using the previously detected marker position, the computation volume for the image position detection can be reduced, and improvement of reproduction speed can be realized.

What is claimed is:

1. An optical-information recording and reproducing apparatus for recording two-dimensional data in an information recording medium by multiplexing and reproducing the two-dimensional data recorded in the information recording medium by utilizing holography serving as an interference pattern of a signal beam and a reference beam, the optical-information recording and reproducing apparatus comprising:

a marker adding unit configured to dispose two or more markers in the two-dimensional data in a case of recording the two-dimensional data, the markers for carrying out position detection of the two-dimensional data;

a correlation-value calculating unit configured to calculate a plurality of correlation values of a plurality of different partial ranges within the two-dimensional data reproduced in a case of reproducing the two-dimensional data;

a first correlation-value retaining unit configured to retain, for each of the two or more of the markers, a first correlation value among the correlation values calculated by the correlation-value calculating unit;

a second correlation-value retaining unit configured to retain, for each of the two or more of the markers, a second correlation value among the correlation values calculated by the correlation-value calculating unit;

a relative correlation-value judging unit configured to calculate, for each of the two or more of the markers, a relative correlation value from the first correlation value retained by the first correlation-value retaining unit and the second correlation value retained by the second correlation-value retaining unit and judge a pass or a fail of a first position detection result of the respective marker according to the relative correlation value;

a mutual position judging unit configured to mutually compare detected positions of each of the markers judged as passes by the relative correlation-value judging unit and judge a pass or a fail of a second position detection result of each of the respective markers judged as passing by the relative correlation-value judging unit;

a complement processing unit configured to complement a respective position of each of the markers judged as failing by the relative correlation-value judging unit or the mutual position judging unit; and a position detecting unit configured to detect a position of the two-dimensional data based on each of the markers judged as passing by the relative correlation-value judging unit and judged as passing by the mutual position judging unit and each of the markers complemented by the complement processing unit.

2. The optical-information recording and reproducing apparatus according to claim 1, wherein the first correlation value is a largest value of the correlation values calculated by the correlation-value calculating unit.

3. The optical-information recording and reproducing apparatus according to claim 1, wherein the second correlation value is an average value, a median value, or a second largest value of the correlation values calculated by the correlation-value calculating unit.

4. The optical-information recording and reproducing apparatus according to claim 1, wherein the relative correlation value is a difference or quotient of the first correlation value and the second correlation value.

5. The optical-information recording and reproducing apparatus according to claim 1, wherein the mutual position judging unit judges the pass or the fail of the second position detection result based on a prescribed position determined in advance for each of the markers and a respective position-detection error amount calculated from a detected position of each of the markers judged as passing by the relative correlation-value judging unit.

6. The optical-information recording and reproducing apparatus according to claim 1, wherein the complement processing unit complements each of the markers judged as failing based on a detected position of each of the markers judged as passing by the relative correlation-value judging unit.

7. The optical-information recording and reproducing apparatus according to claim 3, wherein the complement processing unit selects a complementing process of the markers depending on a number of the markers judged as passing by the relative correlation-value judging unit or the mutual position judging unit.

8. The optical-information recording and reproducing apparatus according to claim 1, wherein the complement processing unit sets a respective position of each of the markers judged as failing at a prescribed position determined in advance.

9. The optical-information recording and reproducing apparatus according to claim 1, further comprising:

a position-detection-result retaining unit configured to retain positions of each of the markers judged as passing by the relative correlation-value judging unit or the mutual position judging unit and retain positions of each of the markers complemented by the complement processing unit, and wherein a plurality of pages are grouped as a book, and the hologram corresponds to an angle of the reference beam and a first one of the pages, and wherein the position detecting unit detects a position of two-dimensional data corresponding to a second one of the pages by using the positions of the markers corresponding to the first one of the pages retained by the position-detection-result retaining unit.

10. An optical-information recording and reproducing method of recording two-dimensional data in an information recording medium by multiplexing and reproducing the two-dimensional data recorded in the information recording medium by utilizing holography serving as an interference pattern of a signal beam and a reference beam, the optical-information recording and reproducing method comprising:

a marker adding step of disposing two or more markers in the two-dimensional data in a case of recording the two-dimensional data, the markers for carrying out position detection of the two-dimensional data;

a correlation-value calculating step of calculating a plurality of correlation values of a plurality of different partial range within the two-dimensional data reproduced in a case of reproducing the two-dimensional data;

a first correlation-value retaining step of retaining, for each of the two or more of the markers, a first correlation value among the calculated correlation values;

a second correlation-value retaining step of retaining, for each of the two or more of the markers, a second correlation value among the calculated correlation values;

a relative correlation-value judging step of calculating, for each of the two or more of the markers, a relative correlation value from the first correlation value retained and the second correlation value retained by the second correlation-value retaining step and judging a pass or a fail of a first position detection result of the respective marker according to the relative correlation value;

a mutual position judging step of mutually comparing detected positions of each of the markers judged as passing by the relative correlation-value judging step and judging a pass or a fail of a second position detection result of each the respective markers judged as passing by the relative correlation-value judging step;

a complement processing step of complementing a respective position of each of the markers judged as failing by the relative correlation-value judging step or the mutual position judging step; and a position detecting step of detecting a position of the two-dimensional data based on each of the markers judged as passing by the relative correlation-value judging step and judged as passing by the mutual position judging step and each of the markers complemented by the complement processing step.

11. The optical-information recording and reproducing method according to claim 10, wherein the first correlation value is a largest value of the correlation values calculated by the correlation-value calculating step.

12. The optical-information recording and reproducing method according to claim 10, wherein the second correlation value is an average value, a median value, or a second largest value of the correlation values calculated by the correlation-value calculating step.

13. The optical-information recording and reproducing method according to claim 10, wherein the relative correlation value is a difference or quotient of the first correlation value and the second correlation value.

14. The optical-information recording and reproducing method according to claim 10, wherein, in the mutual position judging step, the second position detection result is judged based on a prescribed position determined in advance for each of the markers and a respective position-detection error amount calculated from a detected position of each of the markers judged as passing by the relative correlation-value judging step.

15. The optical-information recording and reproducing method according to claim 10, wherein, in the complement processing step, each of the markers judged as failing is complemented based on a detected position of each of the markers judged as passing by the relative correlation-value judging step.

16. The optical-information recording and reproducing method according to claim 12, wherein, in the complement processing step, a complementing process of the markers is selected depending on a number of the markers judged as passing by the relative correlation-value judging step or the mutual position judging step.

17. The optical-information recording and reproducing method according to claim 10, wherein the complement processing step sets a respective position of each of the markers judged as failing at a prescribed position determined in advance.

18. The optical-information recording and reproducing method according to claim 10, further comprising:
a position-detection-result retaining step of retaining positions of each of the markers judged as passing by the relative correlation-value judging step or the mutual position judging step and retaining positions of each of the markers complemented by the complement processing step,
wherein a plurality of pages are grouped as a book, and the hologram corresponds to an angle of the reference beam and a first one of the pages, and
wherein a position of two-dimensional data corresponding to a second one of the pages is detected by using the positions of the markers corresponding to the first one of the pages retained by the position-detection-result retaining step.

* * * * *